US012674574B2

(12) United States Patent
Krugel et al.

(10) Patent No.: US 12,674,574 B2
(45) Date of Patent: Jul. 7, 2026

(54) AUDIO OUTPUT DEVICE WITH A LIGHT EMITTING UNIT

(71) Applicant: MILWAUKEE ELECTRIC TOOL CORPORATION, Brookfield, WI (US)

(72) Inventors: Samantha J. Krugel, Wauwatosa, WI (US); Chelsea L. McCormick, Oak Creek, WI (US); Matthew H. Ogden, Milwaukee, WI (US); Jacob D. Hadfield, Mukwonago, WI (US); Christopher R. Millane, Menomonee Falls, WI (US); Long Biao Liu, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/056,023

(22) Filed: Feb. 18, 2025

(65) Prior Publication Data

US 2025/0271130 A1 Aug. 28, 2025

Related U.S. Application Data

(60) Provisional application No. 63/557,689, filed on Feb. 26, 2024.

(51) Int. Cl.
*F21V 33/00* (2006.01)
*H04R 1/02* (2006.01)
(Continued)

(52) U.S. Cl.
CPC ......... *F21V 33/0056* (2013.01); *H04R 1/025* (2013.01); *H05B 47/155* (2020.01);
(Continued)

(58) Field of Classification Search
CPC .... F21V 33/0056; H05B 47/155; H04R 1/025
See application file for complete search history.

(56) References Cited

U.S. PATENT DOCUMENTS 6,765,496 B2 7/2004 Dayan
7,696,888 B2 4/2010 Swan et al.
(Continued)

FOREIGN PATENT DOCUMENTS

CN 203395663 U 1/2014
CN 203840483 U 9/2014
(Continued)

*Primary Examiner* — Christopher E Dunay
(74) *Attorney, Agent, or Firm* — Michael Best & Friedrich LLP

(57) ABSTRACT

An audio output device may include a housing, a speaker provided in the housing, a plurality of actuators provided on the housing, and a light emitting unit provided on the housing. The light emitting unit includes a plurality of light emitting segments arranged in a line. The audio output device may also include a controller located within the housing and including an electronic processor, a memory, and a transceiver. The controller is coupled to the speaker, the plurality of actuators, and the light emitting unit. The controller is configured to determine that a first actuator of the plurality of actuators is actuated for a first predetermined amount of time, and operate the light emitting unit according to a first light sequence in response to the first actuator being actuated.

16 Claims, 19 Drawing Sheets

(51) Int. Cl.
*H05B 47/155* (2020.01)
*F21Y 115/10* (2016.01)

(52) U.S. Cl.
CPC ....... *F21Y 2115/10* (2016.08); *H04R 2420/07* (2013.01); *H04R 2430/01* (2013.01)

(56) References Cited

U.S. PATENT DOCUMENTS

| | | | | |
|---|---|---|---|---|
| 7,697,891 | B2 | 4/2010 | Desrosiers et al. | |
| 7,774,032 | B2 | 8/2010 | Swan et al. | |
| 9,435,926 | B2 | 9/2016 | Yamamoto et al. | |
| 9,602,903 | B2 | 3/2017 | Black et al. | |
| 10,674,588 | B2 | 6/2020 | Kelly et al. | |
| 11,039,233 | B2 | 6/2021 | Vansickel et al. | |
| 11,149,932 | B1 | 10/2021 | Kelly et al. | |
| 2003/0080686 | A1 | 5/2003 | Dayan | |
| 2005/0128751 | A1* | 6/2005 | Roberge | H05B 45/325 362/276 |
| 2007/0285259 | A1 | 12/2007 | Desrosiers et al. | |
| 2007/0285570 | A1 | 12/2007 | Desrosiers et al. | |
| 2008/0137879 | A1 | 6/2008 | Schwartz et al. | |
| 2008/0152160 | A1* | 6/2008 | Chew | H04M 1/6066 381/370 |
| 2014/0154989 | A1* | 6/2014 | Lane | H04R 1/026 381/77 |
| 2015/0372746 | A1* | 12/2015 | Xie | H04W 4/80 455/11.1 |
| 2016/0234583 | A1* | 8/2016 | Zamir | H04R 1/02 |
| 2016/0377271 | A1 | 12/2016 | Kelly et al. | |
| 2021/0274282 | A1 | 9/2021 | Vansickel et al. | |
| 2022/0049842 | A1 | 2/2022 | Kelly et al. | |
| 2022/0379232 | A1 | 12/2022 | Kelly et al. | |
| 2023/0071184 | A1* | 3/2023 | Yang | H04W 76/30 |
| 2023/0111031 | A1 | 4/2023 | Kelly et al. | |
| 2023/0277953 | A1 | 9/2023 | Kelly et al. | |
| 2023/0277954 | A1 | 9/2023 | Kelly et al. | |
| 2024/0114274 | A1* | 4/2024 | Braun | H04R 1/028 |
| 2025/0073368 | A1* | 3/2025 | Xu | H04R 1/028 |
| 2025/0075897 | A1* | 3/2025 | Bang | H05B 47/16 |
| 2025/0080889 | A1* | 3/2025 | Hadfield | H04R 1/026 |

FOREIGN PATENT DOCUMENTS

| | | | |
|---|---|---|---|
| CN | 104519424 | A | 4/2015 |
| CN | 104519425 | A | 4/2015 |
| CN | 104519426 | A | 4/2015 |
| CN | 104519427 | A | 4/2015 |
| CN | 106454561 | A | 2/2017 |
| CN | 206222067 | U | 6/2017 |
| CN | 207251875 | U | 4/2018 |
| CN | 208783071 | U | 4/2019 |
| CN | 209151310 | U | 7/2019 |
| CN | 209627683 | U | 11/2019 |
| CN | 210183481 | U | 3/2020 |
| CN | 211352375 | U | 8/2020 |
| CN | 212343996 | U | 1/2021 |
| CN | 212414979 | U | 1/2021 |
| CN | 213586185 | U | 6/2021 |
| CN | 213718163 | U | 7/2021 |

* cited by examiner

AUDIO OUTPUT DEVICE WITH A LIGHT EMITTING UNIT

CROSS-REFERENCE TO RELATED APPLICATIONS

This application claims priority to U.S. Provisional Application No. 63/557,689, filed Feb. 26, 2024, the entire contents of which are incorporated by reference herein.

FIELD OF THE INVENTION

The present invention relates to an audio output device and, more particularly, a light emitting unit for an audio output device.

SUMMARY OF THE INVENTION

In addition to playing content, such as music, podcasts, audio files, etc. provided from an external device, audio output devices may convey information to a user. Audio output devices may include a light emitting unit that provides lighting schemes specific to certain information to be conveyed. For example, the light emitting unit may illuminate in a certain scheme to convey that the audio output device is successfully paired via Bluetooth® to an external device, such as a mobile phone. It may be advantageous for the light emitting unit of the audio output device to illuminate in various schemes that correspond to various inputs on the audio output device.

In some aspects, the techniques described herein relate to an audio output device including a housing; a speaker provided in the housing; a plurality of actuators provided on the housing; a light emitting unit provided on the housing, the light emitting unit including a plurality of light emitting segments arranged in a line; and a controller located within the housing and including an electronic processor, a memory, and a transceiver, the controller coupled to the speaker, the plurality of actuators, and the light emitting unit, the controller configured to determine that a first actuator of the plurality of actuators is actuated, and operate the light emitting unit according to a first light sequence in response to the first actuator being actuated.

In some aspects, the techniques described herein relate to an audio output device including a housing; a speaker provided in the housing; a plurality of actuators provided on the housing; a light emitting unit provided on the housing, the light emitting unit including a plurality of light emitting segments arranged in a line; and a controller located within the housing and including an electronic processor, a memory, and a transceiver, the controller coupled to the speaker, the plurality of actuators, and the light emitting unit, the controller configured to determine that a first actuator of the plurality of actuators is actuated to initiate an operation, operate the light emitting unit according to a first light sequence in response to the first actuator being actuated and the operation being initiated, and operate the light emitting unit according to a second light sequence in response to the operation being completed, the second light sequence being different than the first light sequence.

In some aspects, the techniques described herein relate to an audio output device including an elongated housing having a first end, a second end opposite the first end, and a longitudinal axis extending through the first end and the second end; a speaker provided in the elongated housing; a plurality of actuators provided on the elongated housing; and a light emitting unit provided on the elongated housing and including a plurality of light emitting segments arranged in a line extending parallel to the longitudinal axis, the light emitting unit operable to emit a light sequence in response to actuation of one of the plurality of actuators.

Other aspects of the invention will become apparent by consideration of the detailed description and accompanying drawings.

DETAILED DESCRIPTION

Figure 1:
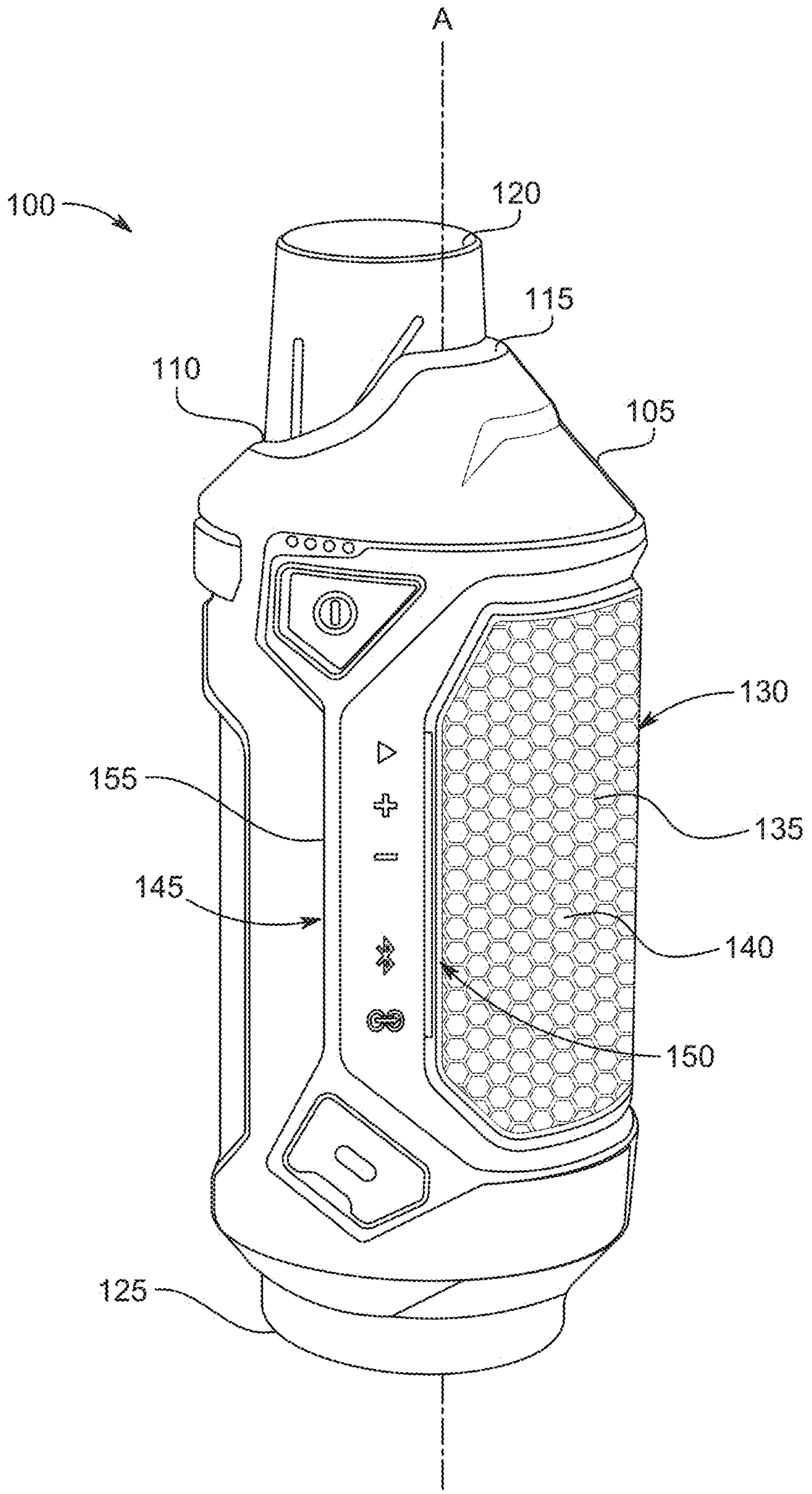
FIG. 1 illustrates an audio output device, according to some embodiments.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Figure 4:
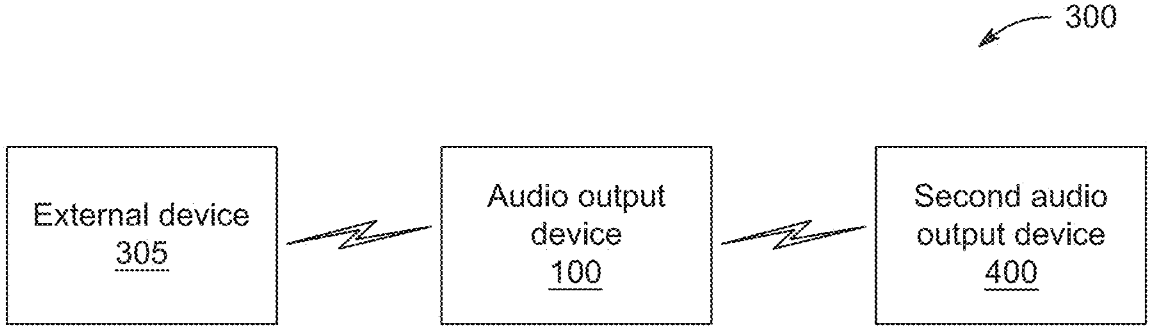
FIG. 4 is a communication network for the audio output device of FIG. 1, an external device, and an additional audio output device, according to some embodiments.

FIG. 1 illustrates an audio output device 100, according to some embodiments. The audio output device 100 may be a portable, wireless device. In some embodiments, the audio output device 100 may receive a wireless signal from an external device, such as external device 305 (FIG. 4), using Bluetooth®, Bluetooth® low energy (BLE), near field communication (NFC), Wi-Fi, cellular data, or other wireless communication schemes. For example, the wireless signal may include sound data, control inputs, notifications, etc. In some embodiments, the audio output device 100 may transmit audio signals and relay wireless signals from the external device to a second audio output device, such as second audio output device 400 (FIG. 4).

The audio output device 100 includes a housing 105. In the illustrated embodiment, the housing 105 is an elongated housing with a battery pack interface 110 provided at a first end 115 of the housing 105 for receiving a battery pack 120. The first end 115 may also be referred to as a top or a top portion. Opposite the first end 115 of the housing 10 is a second end 125 of the housing 105. The second end 125 may also be referred to as a base or a base portion. In some embodiments, the housing 105 is generally cylindrical with the second end 125 including a flat surface for supporting or balancing the audio output device 100. Additionally, the second end 125 may include features (e.g., hooks, magnets, etc.) for attaching the audio output device 100 to another structure. The housing 10 also defines a longitudinal axis A extending through the first end 115 and the second end 125. When the audio output device 100 is upright and supported by the second end 125 (as shown in FIG. 1), the longitudinal axis A is a vertical axis. The audio output device 100 may also be laid on its side. In such an arrangement, the longitudinal axis A is a horizontal.

The audio output device 100 further includes at least one speaker 130, a speaker grill 135 including apertures 140, a user interface 145, and a light emitting unit 150. The speaker 130, speaker grill 135, user interface 145, and light emitting unit may be provided on a rubber portion 155 provided between the first end 115 and the second end 125 of the housing 105. The speaker grill 135 may be made of metal or plastic and is configured to inhibit debris from contacting the speaker 130. The speaker grill 135 includes a plurality of apertures 140 that allow sound to be emitted from the speakers 130. In some embodiments, the speaker grill 135 and the speaker 130 occupy a surface area of the audio output device in a 1:1 ratio. Alternatively, in some embodiments, the speaker grill 135 and the speaker 130 occupy a surface area of the audio output device in a 3:2 ratio. In some embodiments, the audio output device 100 may include one, two, three, or four speakers 130. The speakers 130 may include a mid-range speaker, a tweeter, a woofer, a subwoofer, a supertweeter, multiple tweeters, or any combination thereof. In other embodiments, the audio output device 100 may include other types of speakers.

The user interface 145 includes a plurality of actuators that will be described with respect to FIG. 2. In some embodiments, the light emitting unit 150 is provided between the speaker grill 135 and the user interface 145 along the rubber portion 155 of the housing 105. In the illustrated embodiment, the light emitting unit 150 is provided next to or directly adjacent the user interface 145. For example, the light emitting unit 150 may be provided on the right-hand side of the user interface 145. Alternatively, in some embodiments, the light emitting unit 150 may be provided on the left-hand side of the user interface 145. In still other embodiments, the user interface 145 and the light emitting unit 150 may be provided on other parts of the housing 105.

The battery pack 120 may be interchangeable and used with a plurality of battery powered devices. For example, the plurality of battery powered devices may include power tools such as drills, other audio output devices, lighting devices, or other battery powered devices. In one example, the battery pack 120 may be used to power the audio output device 100 and a power tool (not shown)

In some embodiments, the battery pack 120 includes one or more lithium-ion battery cells. In other embodiments, the battery pack 120 may be of a different chemistry, for example, nickel-cadmium, nickel-metal hydride, and the like. In some embodiments, the battery cells may include one or more cylindrical cells, one or more pouch cells, one or more prismatic cells, or a combination thereof. In some embodiments, the battery pack 120 may include anywhere in the range of three to six battery cells. In the illustrated embodiment, the battery pack 12 is a 12V battery pack outputting a constant 12V output. In other embodiments, the output voltage level of the battery pack 120 may be different. For example, the battery pack 120 may be a 4V battery pack, and 18V battery pack, 28V battery pack, 40V battery pack, or another voltage. The battery pack 120 may also have various capacities (e.g., 3, 4, 5, 6, 8, or 12 A/hr). The output of the battery cells may be in the range of 3.0-6.0 Ampere-hours (Ah).

Figure 2:
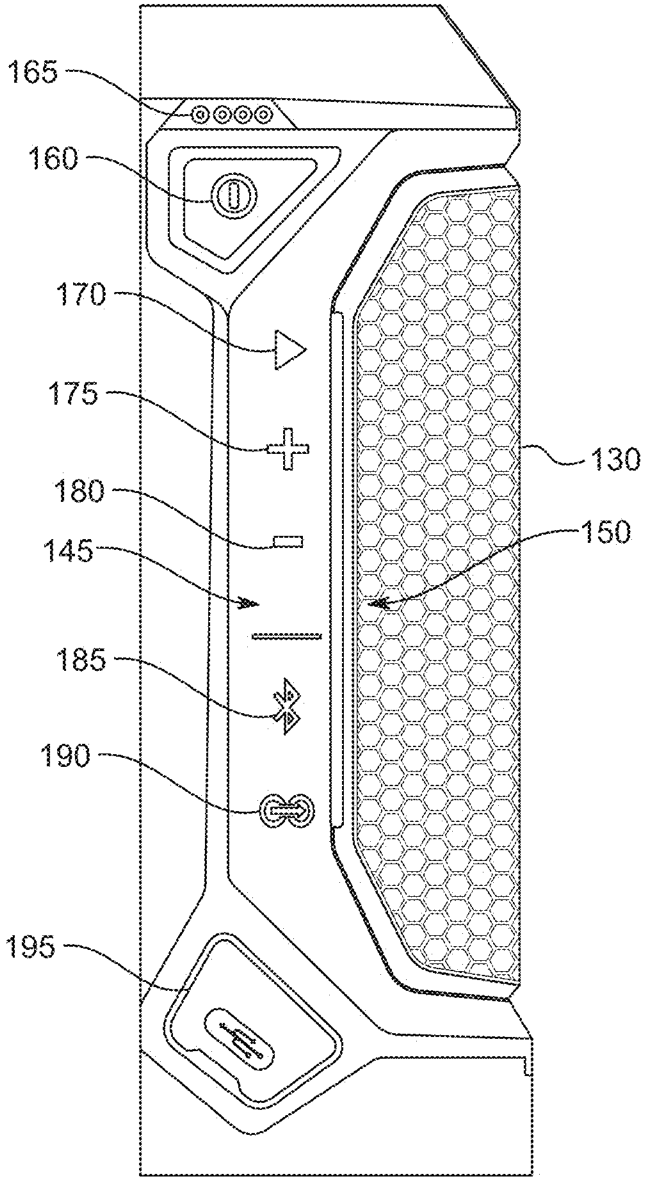
FIG. 2 illustrates a user interface of the audio output device of FIG. 1, according to some embodiments.

FIG. 2 illustrates the user interface 145 of the audio output device 100, according to some embodiments. The user interface 145 includes a power actuator 160, a fuel gauge 165, a play actuator 170, a volume increase actuator 175, a volume decrease actuator 180, a Bluetooth® actuator 185, a daisy chain actuator 190, and a charging port 195. In some embodiments the actuators 160, 170, 175, 180, 185, 190 are provided in descending order from the first end 115 to the second end 125 of the housing 105 along the longitudinal axis A, as listed in the preceding sentence. For example, the illustrated actuators 170, 175, 180, 185, 190 are arranged in a line that is parallel to the longitudinal axis A. In some embodiments, the power actuator 160 occupies a greater surface area of the rubber portion 155 than each of the play actuator 170, the volume increase actuator 175, the volume decrease actuator 180, the Bluetooth® actuator 185, and the daisy chain actuator 190. The actuators 160, 170, 175, 180, 185, 190 may be capacitive touch buttons, physical buttons, dials, switches, slides, and the like. In some embodiments, the actuators 160, 170, 175, 180, 185, 190 may include an LED that illuminates upon actuation. For example, the LED may shine through a window in the rubber portion 155 that is the shape of the function of the particular actuator. In some embodiments, the charging port 195 is a USB-C charging port that provides power to the battery pack 120. The charging port 195 may also or alternatively provide power to an external device from the battery pack 120. In other embodiments, the charging port 195 may be a different type of port.

The fuel gauge 165 is a separate indicator from the light emitting unit 150 and the actuators 160, 170, 175, 180, 185, 190. In some embodiments, the fuel gauge 165 is provided adjacent the power actuator 160. For example, the fuel gauge 165 may be provided on an edge of the power actuator 160 closer to the first end 115 of the housing 105 (e.g., on a top edge of the power actuator 160). In other embodiments, the fuel gauge 165 may be located elsewhere on the housing 105. The fuel gauge 165 is configured to display an amount of a charge of the battery pack 120 coupled to the battery pack interface 110. In the illustrated embodiment, the fuel gauge 165 includes a series (e.g., four) LEDs. In other embodiments, the fuel gauge 165 may have other configurations.

In some embodiments, actuation of the play actuator 170 controls a play/pause function of content (i.e., audio) playing over the speaker 130 of the audio output device 100 from the external device 305. Actuation of the play actuator 170 may also skip forward or skip backward through the content. In some embodiments, actuation of the volume increase actuator 175 increases the volume of the content playing over the speaker 130. In some embodiments, actuation of the volume decrease actuator 180 decreases the volume of the content playing over the speaker 130. In some embodiments, actuation of the Bluetooth® actuator 185 enters the audio output device 100 into a Bluetooth® pairing mode. In some embodiments, actuation of the daisy chain actuator 190 enters the audio output device 100 into a daisy chaining mode.

Figure 3:
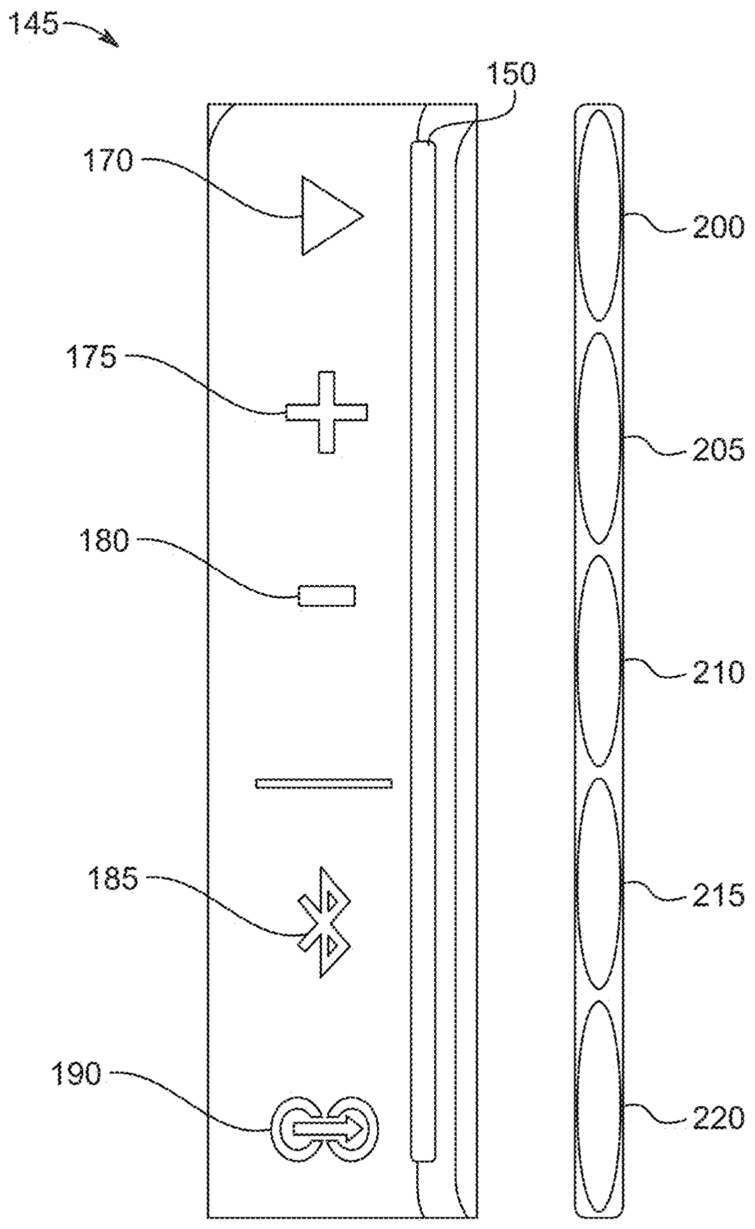
FIG. 3 illustrates the user interface and a light emitting unit of FIG. 2, according to some embodiments.

FIG. 3 illustrates the user interface 145 and the light emitting unit 150, according to some embodiments. In some embodiments, the light emitting unit 150 includes a plurality of light emitting segments 200, 205, 210, 215, 220. In some embodiments, each light emitting segment 200, 205, 210, 215, 220 corresponds to an actuator of the user interface 145. For example, the first light emitting segment 200 corresponds to the play actuator 170, the second light emitting segment 205 corresponds to the volume increase actuator 175, the third light emitting segment 210 corresponds to the volume decrease actuator 180, the fourth light emitting segment 215 corresponds to the Bluetooth® actuator 185, and the fifth light emitting segment 220 corresponds to the daisy chain actuator 190. As such, in the illustrated embodiment, the light emitting unit 150 includes five light emitting segments. In other embodiments, the light emitting unit 150 may include fewer or more light emitting segments. Additionally, although the illustrated lighting emitting unit 150 includes one light emitting segment corresponding to each actuator, in other embodiments, the light emitting unit 150 may include a different number of light emitting segments from the actuators, and/or the user interface 145 may include fewer or more actuators. Similar to the actuators, the illustrated light emitting segments 200, 205, 210, 215, 220 are arranged in a line that is parallel to the longitudinal axis A. In other embodiments, the light emitting segments 200, 205, 210, 215, 220 may be arranged in a line that is angled relative to the longitudinal axis A.

In some embodiments, each light emitting segment 200, 205, 210, 215, 220 includes one light emitting diode (LED). Additionally, or alternatively, in some embodiments, each light emitting segment 200, 205, 210, 215, 220 includes a plurality of LEDs. In some embodiments, each light emitting segment 200, 205, 210, 215, 220 may be comprised of color-changing LEDs. For example, the LEDs may communicate data to a user using different colors, such as red, blue, green, etc. In some embodiments, the segments 200, 205, 210, 215, 220 are arranged sequentially on the housing 105 without interruption (i.e., a portion of the housing 105 does not extend between adjacent segments 200, 205, 210, 215, 220). In other words, the segments 200, 205, 210, 215, 220 are arranged in a row, a continuous line, a strip, or an uninterrupted line on the housing 105.

FIG. 4 is a communication network 300 for the audio output device 100, an external device 305, and a second audio output device 400, according to some embodiments.

As noted above, the audio output device 100 may communicate with an external device 305. In such embodiments, the audio output device 100 may include, for example, a wireless communication controller (e.g., the Bluetooth® controller 515) described above, which includes a transceiver to communicate with the external device 305 via, for example, a short-range communication protocol, such as Bluetooth®. The external device 305 may include a short-range transceiver, such as Bluetooth® controller 615 (FIG. 6), to communicate with the audio output device 100, and may also include a long-range transceiver, such as communication interface 620 (FIG. 6), to communicate with a server (not shown). In some embodiments, a wired connection (via, for example, a USB cable) is provided between the external device 305 and the audio output device 100 to enable direct communication between the external device 305 and the audio output device 100.

The external device 305 may include, for example, a smart telephone, a tablet computer, a cellular phone, a laptop computer, a smart watch, and any other communication device that is external to the audio output device 100. The external device 305 may communicate with the audio output device 100 and may provide content (e.g., audio) to be played out of the speaker 130 of the audio output device 100. For example, the audio may be sent as a first data packet from the external device 305 to the speaker 130.

The audio output device 100 may be daisy chained to a second audio output device 400 to extend the audible range of the content being played from the audio output devices 100, 400 or to create a surround sound experience using the audio output devices 100, 400. In some embodiments, the audio output device 100 is the parent device and the second audio output device 400 is the child device. The content may be played simultaneously from both audio output devices 100, 400. Additional audio output devices may be added to the daisy chain. For example, the audio output device 100 may be the parent device to 2-5 child devices. The second audio output device 400 may be identical to the audio output device 100 and may include the same user interface, light emitting unit, and speaker, among other similar features.

When the second audio output device 400 moves out of range of the audio output device 100, content playing over the speakers of the audio output device 100, such as speaker 130, and the second audio output device 400 is paused until the second audio output device 400 moves back in range. When the second audio output device 400 moves out of range of the audio output device 100 for 30 minutes or more, the second audio output device 400 is turned OFF. The audio output device 100 has control over the second audio output device 400, as well as any additional daisy chained audio output devices. The volume of each daisy chained audio output device may be controlled at the audio output device 100 (e.g., via the volume actuators 175, 180). The play/pause of each daisy chained audio output device may be controlled at the audio output device 100 (e.g., via the play actuator 170). The forward and back control of each daisy chained audio output device may be controlled at the audio output device 100. Child audio output devices, such as the second audio output device 400 may independently adjust the volume of their speakers (the volume delta will be maintained when the volume is then adjusted by the parent audio output device), control the mute/unmute of the second audio output device 400 when a play/pause actuator of the second audio output device 400 is actuated, and be removed from the daisy chain via actuation of a daisy chain actuator.

Figure 5:
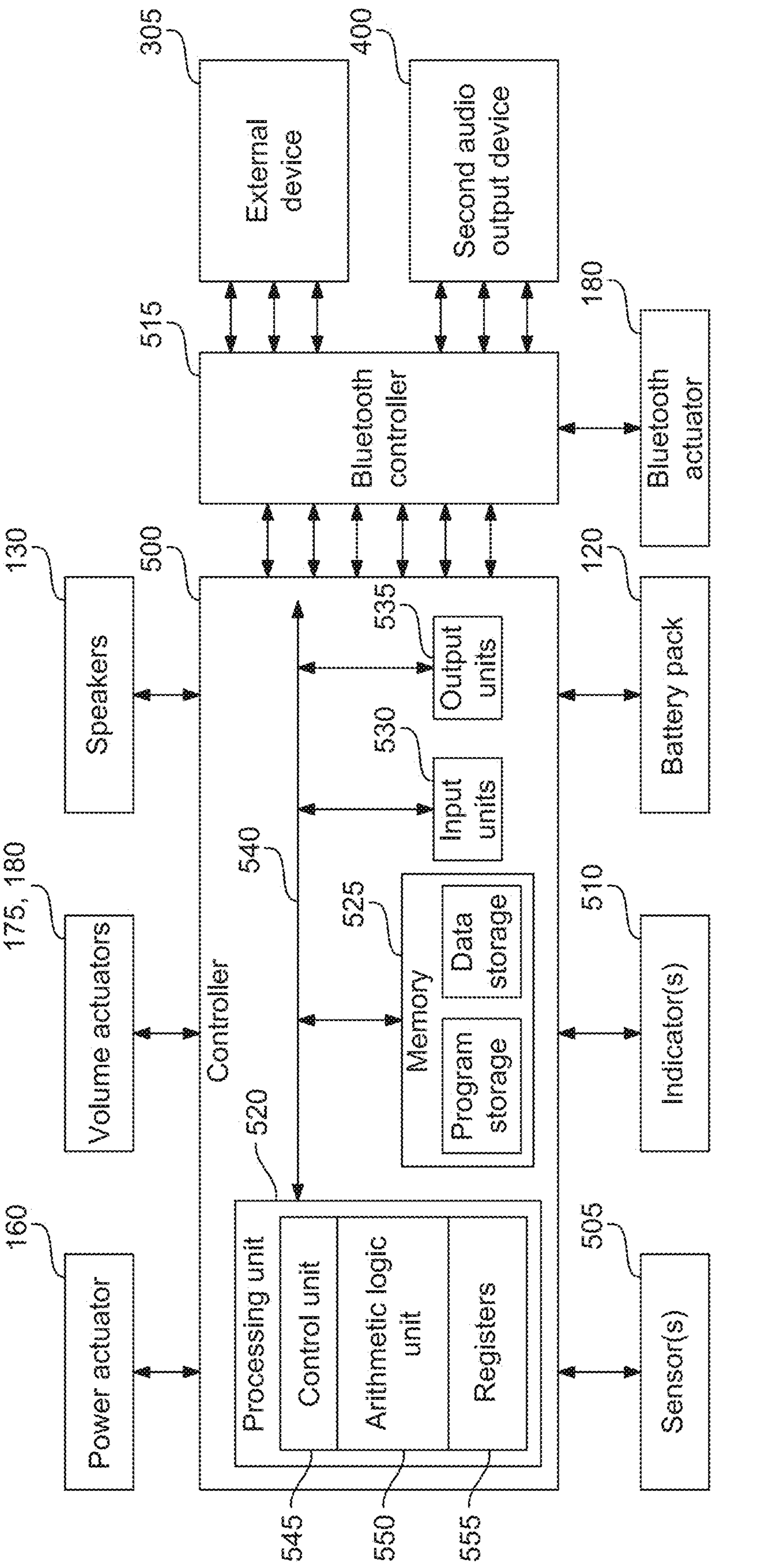
FIG. 5 is a block control diagram of the audio output device of FIG. 1, according to some embodiments.

A controller 500 of the audio output device 100 is illustrated in FIG. 5. In some embodiments, the controller 500 is the same in each audio output device. The controller 500 is electrically and/or communicatively connected to a variety of modules or components of the audio output device 100. For example, the illustrated controller 500 is connected to one or more sensors 505 (which may include, for example, current sensors, voltage sensors, temperature sensor, timers, etc., or a combination thereof), one or more indicators 510, the battery pack 120, a Bluetooth® controller 515, the power actuator 160, the volume actuators 175, 180, and the speakers 130.

The controller 500 includes a plurality of electrical and electronic components that provide power, operational control, and protection to the components and modules within the controller 500 and/or heated garment. For example, the controller 500 includes, among other things, a processing unit 520 (e.g., a microprocessor, an electronic processor, an electronic controller, a microcontroller, or another suitable programmable device), a memory 525, input units 530, and output units 535. The processing unit 520 includes, among other things, a control unit 545, an arithmetic logic unit ("ALU") 550, and a plurality of registers 555 (shown as a group of registers in FIG. 5), and is implemented using one or more computer architecture (e.g., a modified Harvard architecture, a von Neumann architecture, etc.). The processing unit 520, the memory 525, the input units 530, and the output units 535, as well as the various modules connected to the controller 500 are connected by one or more control and/or data buses (e.g., common bus 540). The control and/or data buses are shown generally in FIG. 5 for illustrative purposes. The use of one or more control and/or data buses for the interconnection between and communication among the various modules and components would be known to a person skilled in the art in view of the embodiments described herein.

The memory 525 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 520 is connected to the memory 525 and executes software instructions that are capable of being stored in a RAM portion of the memory 525 (e.g., during execution), a ROM portion of the memory 525 (e.g., on a generally permanent basis), or another non-transitory computer readable medium, such as another memory or a disc. Software included in the implementation of the audio output device 100 can be stored in the memory 525 of the controller 500. The software includes, for example, firmware, one or more applications, program data, filters, rules, one or more program modules, and other executable instructions. The controller 500 is configured to retrieve from the memory 525 and execute, among other things, instructions related to the control processes and methods described herein. In other embodiments, the controller 500 includes additional, fewer, or different components.

The indicators 510 receive control signals from the controller 500 to turn ON and OFF or otherwise convey information based on different inputs to the controller 500. In some embodiments, the indicators 510 may include the light emitting unit 150 (including light emitting segments 200, 205, 210, 215, 220) and the fuel gauge 165. For example, the light emitting segments 200, 205, 210, 215, 220 may illuminate when the audio output device 100 is powered ON, when the audio output device 100 enters Bluetooth® pairing mode, when the audio output device 100 pairs with a device via Bluetooth®, when the audio output device 100 is powered OFF, when the audio output device 100 loses Bluetooth® connection, when the audio output device 100 is daisy chained with a second audio output device 400, when the play actuator 170 is actuated, when the volume actuators 175, 180 are actuated, and the like. The fuel gauge 165 may display the state of charge of the battery pack 120. For example, the fuel gauge 165 may display the state of charge continuously while the audio output device 100 is ON. As another example, the fuel gauge 165 may temporarily or briefly display the state of charge upon powering ON of the audio output device 100. After a short period of time (e.g., 3 seconds), the fuel gauge 165 may turn off (i.e., stop displaying the state of charge).

The indicators 510 include, for example, one or more light-emitting diodes (LEDs), a display screen (e.g., an LCD display), or a combination thereof. The display/indicator(s) 510 may also include additional elements to convey information to a user through one or more audible outputs, tactile outputs (e.g., a speaker), or a combination thereof. The display/indicator(s) 510 may also be referred to as an output device configured to provide an output to a user.

The controller 500 may receive an input from the power actuator 160 to turn ON/OFF the audio output device 100. The controller 500 may further receive an input from the volume actuators 175, 180 to increase/decrease the volume of the content playing over the speakers 130. The controller 500 may also receive input from the play actuator 170 to play, pause, skip forward, or skip backward the content playing over the speaker 130. Additionally, the controller 500 may receive input from the daisy chain actuator 190.

The Bluetooth® controller 515 enables the audio output device 100 to communicate with other Bluetooth® enabled devices, such as the Bluetooth® controller 615 of the external device 305 or a Bluetooth® controller 615 of a second audio output device 400, when the audio output device 100 is in range of the other devices. In some embodiments, the audio output device 100 may communicate with other devices over a network (not shown). The Bluetooth® controller 515 includes a transceiver to send and receive data to other devices. In some embodiments, the Bluetooth® controller 515 pairs with other devices when the Bluetooth® actuator 180 is actuated by a user of the audio output device 100.

Figure 6:
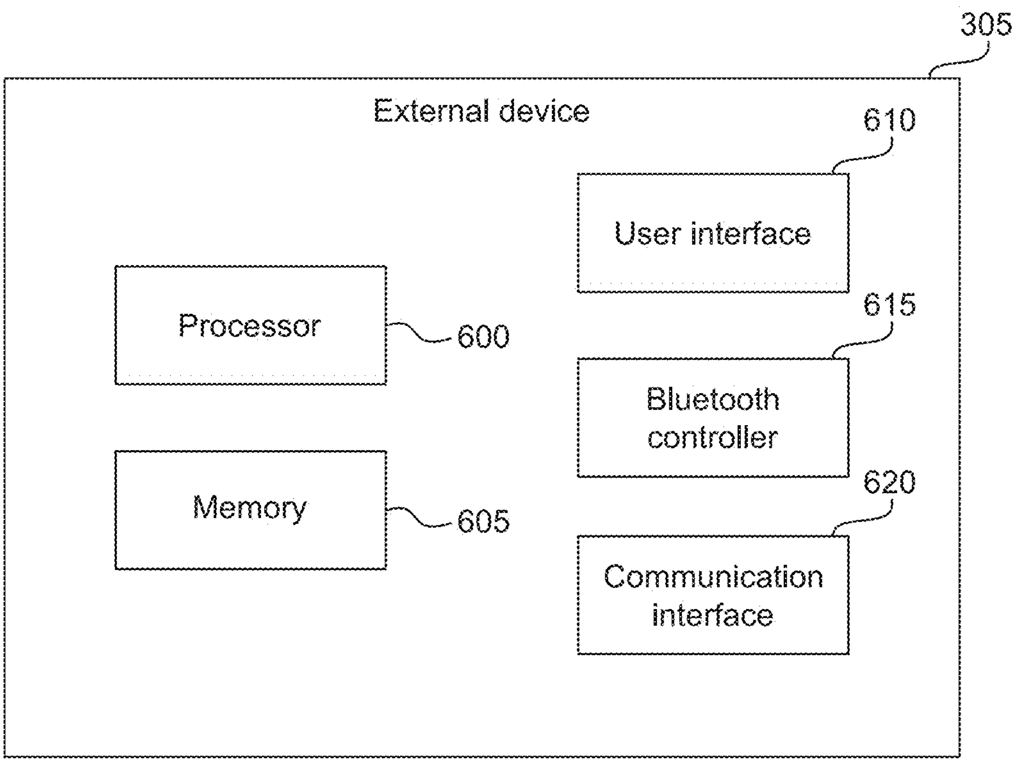
FIG. 6 is a block diagram of an external device, according to some embodiments.

FIG. 6 is a block diagram of the external device 305. In some embodiments, the external device 305 may include one or more processors 600, a memory 605, a user interface 610, the Bluetooth® controller 615, and the communication interface 620. A memory bus may be used for communication between the processor 600 and the memory 605.

The processor 600 may be, for example, an electronic processor, a microprocessor (μP), a microcontroller (μC), a digital signal processor (DSP), or a combination thereof. The processor 600 may include one or more levels of caching, such as a level cache memory, a processor core, and registers. The processor core may include an arithmetic logic unit (ALU), a floating point unit (FPU), a digital signal processing core (DSP Core), or any combination thereof. A memory controller may also be used with the processor 600, or in some implementations, the memory controller may be an internal part of the processor 600. In some embodiments, the memory 605 may be an application for playing content. For example, the processor 600 may execute an audio application (app) stored in the memory 605 based on input received at the user interface 610 which sends content (e.g., audio) to the audio output device 100. Depending on the desired configuration, the memory 605 include, for example, volatile memory (such as RAM), non-volatile memory (such as ROM, flash memory, etc.), or a combination thereof.

The user interface 610 may include a hardware screen that may be communicatively coupled to the external device 305. The user interface 610 may include a touch sensitive device that detects gestures such as a touch action. The user interface 610 may also provide feedback in response to detected gestures (or other forms of input).

The Bluetooth® controller 615 enables the external device 305 to communicate with other Bluetooth® enabled devices, such as the Bluetooth® controller 515 of the audio output device 100, when the external device 305 is in range of the other devices. In some embodiments, the external device 305 may communicate with other devices over a network (not shown) via the communication interface 620. For example, the communication interface 620 may include a transceiver. As previously noted, the devices described herein are not limited to communicating via the Bluetooth® protocol and may use other forms and protocols of wireless communication.

The external device 305 may have additional features or functionality, and additional interfaces to facilitate communications between the external device 305 and other devices (e.g., audio output device 100) or networks. The external device 305 may also have additional internal components not illustrated in FIG. 6.

FIGS. 7A-16 depict exemplary methods or operations of the audio output device 100. The light emitting unit 150 is configured to output or display different light sequences based on or in response to operation of the audio output device 100. For example, the light emitting unit 150 may output a light sequence in response to actuation of an actuator 160, 170, 175, 180, 185, 190. The light sequences may be different patterns of illumination of the light emitting segments 200, 205, 210, 215, 220. For example, the light emitting segments 200, 205, 210, 215, 220 may illuminate at different times. In addition, the light emitting segments 200, 205, 210, 215, 220 may illuminate at different brightnesses or intensities. Furthermore, the light emitting segments 200, 205, 210, 215, 220 may illuminate in different colors. As such, the light emitting unit 150 may output different patterns of wave effects, ripple effects, alternating patterns, flashing patterns, asymmetric patterns, irregular patterns, and the like to indicate a current operation or state of the audio output device 100. For some operations, the light emitting unit 150 may output a first light sequence at a start of an operation to indicate the operation is being initiated, and may output a second light sequence at an end of the operation to indicate the operation is complete.

In addition to outputting light sequences via the light emitting unit 150, the audio output device 100 may also output tones associated with an operation or actuation of an actuator 160, 170, 175, 180, 185, 190 through the speaker 130. In some embodiments, the tone may be synched with the light sequence. That is, the tone may be played with or at least start with the light sequence. In other embodiments, the tone may be played before the light sequence begins.

Figure 7A:
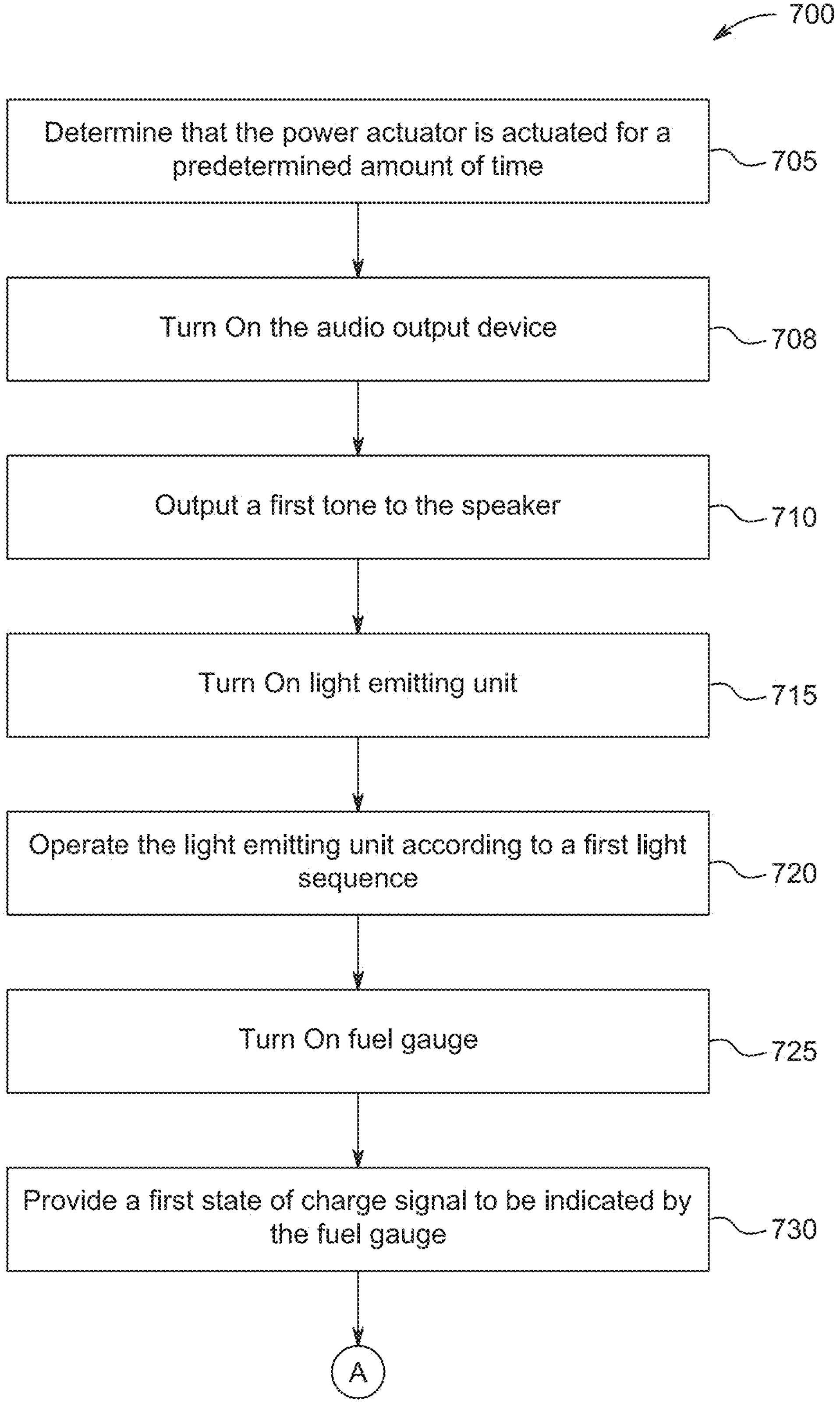
FIG. 7A is a flow chart illustrating a method of powering ON the audio output device, according to some embodiments.
Figure 7B:
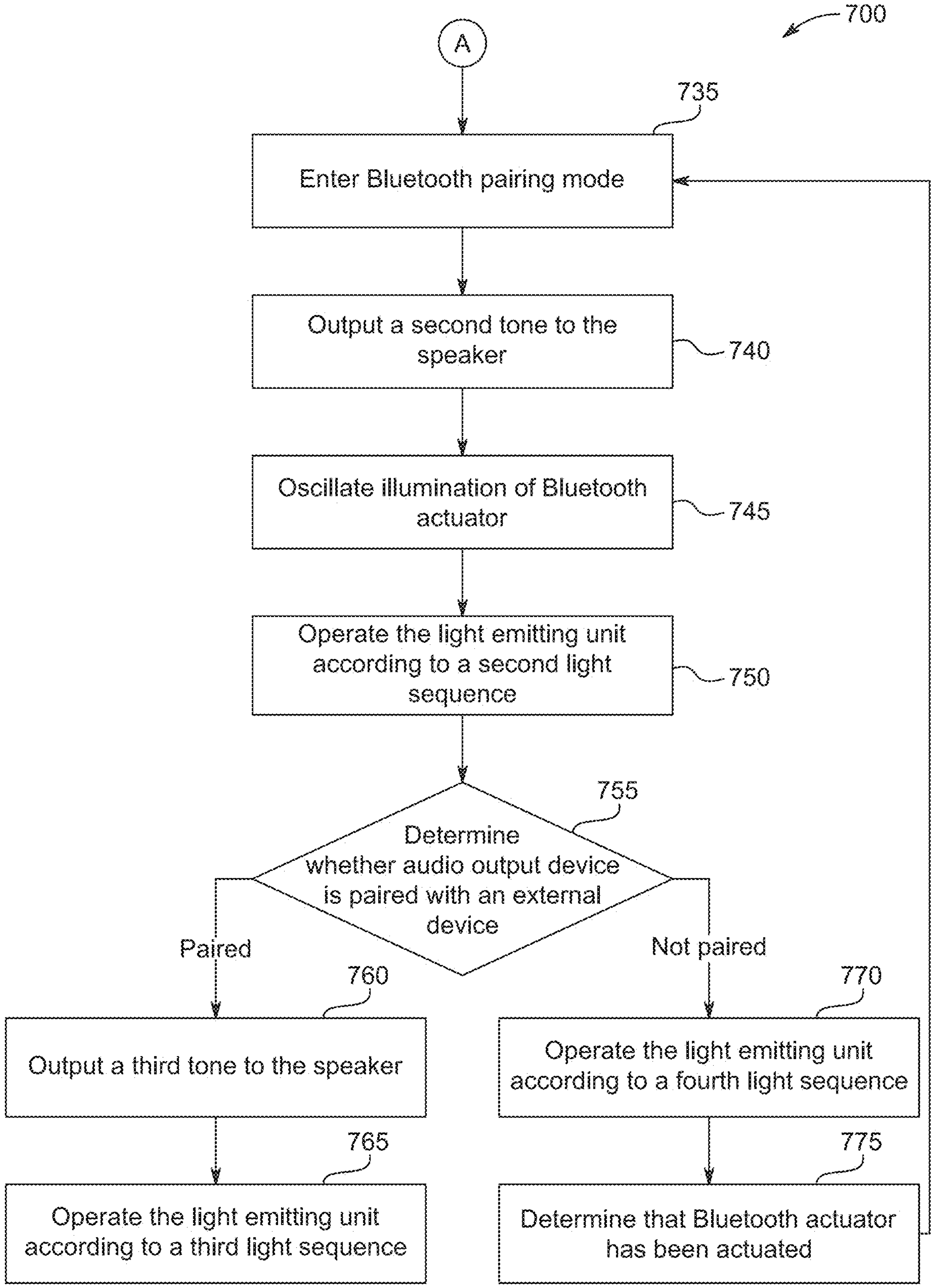
FIG. 7B is a flow chart illustrating a method of pairing the audio output device with an external device upon powering ON, according to some embodiments.

FIGS. 7A and 7B are a method 700 of powering ON the audio output device 100 and pairing the audio output device 100 with an external device, such as external device 305, upon powering ON, according to some embodiments. Although the illustrated method 700 includes specific steps, not all of the steps need to be performed or need to be performed in the order presented. In some embodiments, the method 700 is executed by the audio output device controller 500. The values of various thresholds or ranges described with respect to method 700 are provided as non-limiting examples and other values for such parameters are possible and may vary based on the type or condition of the audio output device 100, the type or condition of the external device 305, other factors, or a combination thereof.

The method 700 includes the controller 500 determining that the power actuator 160 of the audio output device 100 is actuated for a predetermined amount of time (step 705). In some embodiments, the predetermined amount of time is a first predetermined amount of time. For example, the first predetermined amount of time may be any time less than 750 milliseconds (ms). In step 708, the controller 500 turns ON the audio output device 100. In some embodiments, turning ON the audio output device 100 includes allowing the flow of power from the battery pack 120 to the audio output device components coupled to the controller 500. In step 710, the controller 500 outputs a first tone to the speaker 130. In some embodiments, the first tone is a certain pitch and frequency. For example, the first tone may be a "ramp-up" tone that increases exponentially in pitch or frequency over the course of one second. In some embodiments, the first tone is volume independent.

In step 715, the controller 500 turns ON the light emitting unit 150. In some embodiments, each segment 200, 205, 210, 215, 220 illuminates. In step 720, the controller 500 provides a first light sequence to be emitted by the light emitting unit 150. In other words, the controller 500 operates the light emitting unit 150 according to the first light sequence. In some embodiments, the first light sequence includes illuminating the third segment 210, implementing a 100 ms delay, illuminating the second segment 205 and the fourth segment 215, implementing another 100 ms delay, and illuminating the first segment 200 and the fifth segment 220. For example, the first light sequence may be a "ripple" light sequence.

In step 725, the controller 500 turns ON the fuel gauge 165 of the audio output device 100. In step 730, the controller provides a first state of charge signal of the battery pack 120 to be indicated by the fuel gauge 165. For example, a first LED of four LEDs comprising the fuel gauge 165 may be illuminated to indicate or display a low state of charge of the battery pack 120. Alternatively, all four LEDs comprising the fuel gauge 165 may be illuminated to indicate or display a full or high state of charge of the battery pack 120. The method continues to FIG. 7B. In some embodiments, when the state of charge of the battery pack 120 is low, a low battery tone plays every 60 seconds until the battery pack 120 dies, the audio output device 100 is powered OFF, or a new battery pack is inserted. For example, the low battery tone may be two distinct sounds in descending pitch/frequency.

In step 735, the controller 500 enters into a Bluetooth® pairing mode. In some embodiments, the Bluetooth® controller 515 of the audio output device 100 broadcasts a unique key (e.g., a UUID) at a set interval when in pairing mode. In step 740, the controller 500 outputs a second tone to the speaker 130. In some embodiments, the second tone is a certain pitch and frequency. For example, the second tone may be three distinct sounds each a first length in time in ascending pitch or frequency that are repeated throughout the course of the pairing mode. In some embodiments, the second tone is volume independent. In step 745, the controller oscillates illumination of the Bluetooth® actuator 185. In some embodiments, and LED of the Bluetooth® actuator 185 flashes slowly at a rate of 1.0 Hertz (Hz) while the audio output device 100 searches for a Bluetooth® capable device, such as external device 305.

In step 750, the controller 500 provides a second light sequence to be emitted by the light emitting unit 150. In other words, the controller 500 operates the light emitting unit 150 according to the second light sequence. In some embodiments, the second light sequence includes turning OFF each segment 200, 205, 210, 215, 220, implementing a 100 ms delay, illuminate the third segment 210, implementing another 100 ms delay, illuminating the second segment 205 and the fourth segment 215, dimming the third segment 210 to a 30% illumination level (i.e., brightness), implementing another 100 ms delay, turning OFF the third segment 210, dimming the second segment 205 and the fourth segment 215 to the 30% illumination level, illuminating the first segment 200 and the fifth segment 220, implementing another 100 ms delay, turning OFF the second segment 205 and the fourth segment 215, dimming the first segment 200 and the fifth segment 220 to the 30% illumination level, implementing another 100 ms delay, turning OFF the first segment 200 and the fifth segment 220, implementing a 2200 ms delay, and then repeating the second light sequence starting at illuminating the third segment 210 again until pairing is complete or times out.

In decision step 755, the controller 500 determines whether the audio output device 100 is paired with an external device, such as external device 305. In some embodiments, the Bluetooth® controller 515 receives a receipt from the Bluetooth® controller 615 of the external device 305 to determine that the external device 305 is paired with the audio output device 100. When the controller 500 determines that the audio output device 100 is paired with the external device 305, the method 700 proceeds to step 760. When the controller 500 determines that the audio output device 100 is not paired with the external device 305, the method 700 proceeds to step 770. In some embodiments, the controller 500 tries to pair the audio output device 100 with the external device 305 for three minutes before determining that the audio output device 100 is not paired with the external device 305.

In step 760 (PAIRED at decision step 755), the controller 500 outputs a third tone to the speaker 130. In some embodiments, the third tone is a certain pitch and frequency. For example, the third tone may be two distinct sounds each a second length in time in ascending pitch or frequency. In some embodiments, the third tone is volume independent. In step 765, the controller 500 outputs a third light sequence to be emitted by the light emitting unit 150. In other words, the controller 500 operates the light emitting unit 150 according to the third light sequence. In some embodiments, the third light sequence includes turning OFF each segment 200, 205, 210, 215, 220, illuminating the first segment 200 and the fifth segment 220, implementing a 100 ms delay, illuminating the second segment 205 and the fourth segment 215, implementing another 100 ms delay, and illuminating the third segment 210.

In step 770 (NOT PAIRED at decision step 755), the controller 500 provides a fourth light sequence to be emitted by the light emitting unit 150. In other words, the controller 500 operates the light emitting unit 150 according to the fourth light sequence. In some embodiments, the fourth light sequence includes illuminating each segment 200, 205, 210, 215, 220 and oscillating illumination of the segments at a rate of 0.5 Hz for a predetermined amount of time before illuminating each segment 200, 205, 210, 215, 220 solid. In step 775, the controller 500 determines that the Bluetooth® actuator has been actuated. The method 700 then begins again at step 735 to reinitiate a pairing mode of the audio output device 100. In some embodiments, the controller 500 may pair the audio output device 100 with a new external device (different from the paired external device 305) when the Bluetooth® actuator is actuated for more than 750 ms. The controller 500 then repeats the pairing mode of the audio output device 100.

Figure 8:
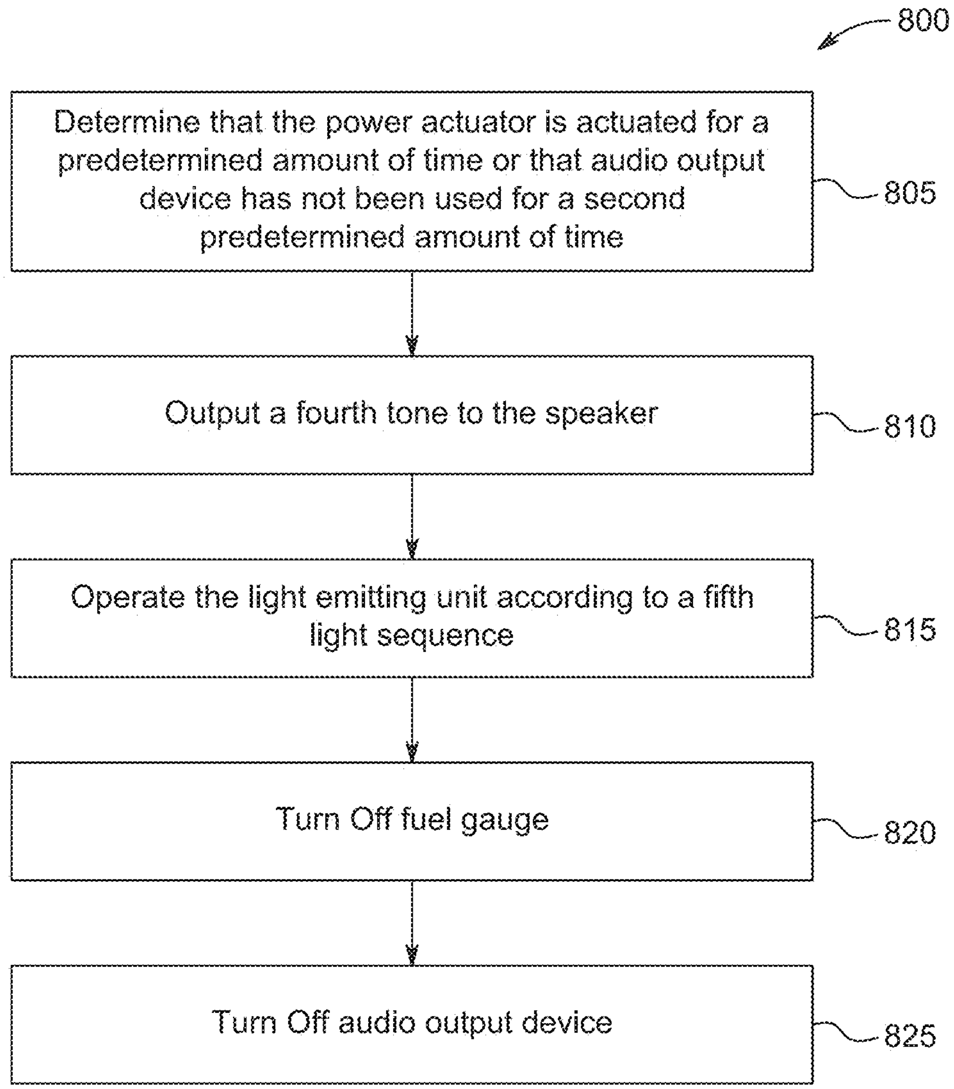
FIG. 8 is a flow chart illustrating a method of powering OFF the audio output device, according to some embodiments.

FIG. 8 is a method 800 of powering OFF the audio output device 100, according to some embodiments. Although the illustrated method 800 includes specific steps, not all of the steps need to be performed or need to be performed in the order presented. In some embodiments, the method 800 is executed by the audio output device controller 500. The values of various thresholds or ranges described with respect to method 800 are provided as non-limiting examples and other values for such parameters are possible and may vary based on the type or condition of the audio output device 100, the type or condition of the external device 305, other factors, or a combination thereof.

The method 800 includes the controller 500 determining that the power actuator 160 is actuated for a predetermined amount of time or that the audio output device 100 has not been used for a second predetermined amount of time (step 805). In some embodiments, the predetermined amount of time is a first predetermined amount of time. For example, the first predetermined amount of time may be any time less than 750 milliseconds (ms). In some embodiments, the second predetermined amount of time is 30 minutes. In some embodiments, not in use means that the audio output device 100 has not played any content over the speaker 130.

In step 810, the controller 500 outputs a fourth tone to the speaker 130. In some embodiments, the fourth tone is a certain pitch and frequency. For example, the fourth tone may be a "ramp-down" tone that decreases exponentially in pitch or frequency over the course of one second. In some embodiments, the fourth tone is volume independent. In step 815, the controller 500 provides a fifth light sequence to be emitted by the light emitting unit 150. In other words, the controller 500 operates the light emitting unit 150 according to the fifth light sequence. In some embodiments, the fifth light sequence includes turning OFF the first segment 200 and the fifth segment 220, implementing a 100 ms delay, turning OFF the second segment 205 and the fourth segment 215, implementing another 100 ms delay, and turning OFF the third segment 210. For example, the fifth light sequence may be a reverse "ripple" light sequence that completely turns OFF the light emitting unit 150.

In step 820, the controller 500 turns OFF the fuel gauge 165. In step 825, the controller 500 turns OFF the audio output device 100. In some embodiments, the controller 500 cuts off the flow of power from the battery pack 120 to the audio output device components coupled to the controller 500 to turn OFF the audio output device 100.

Figure 9A:
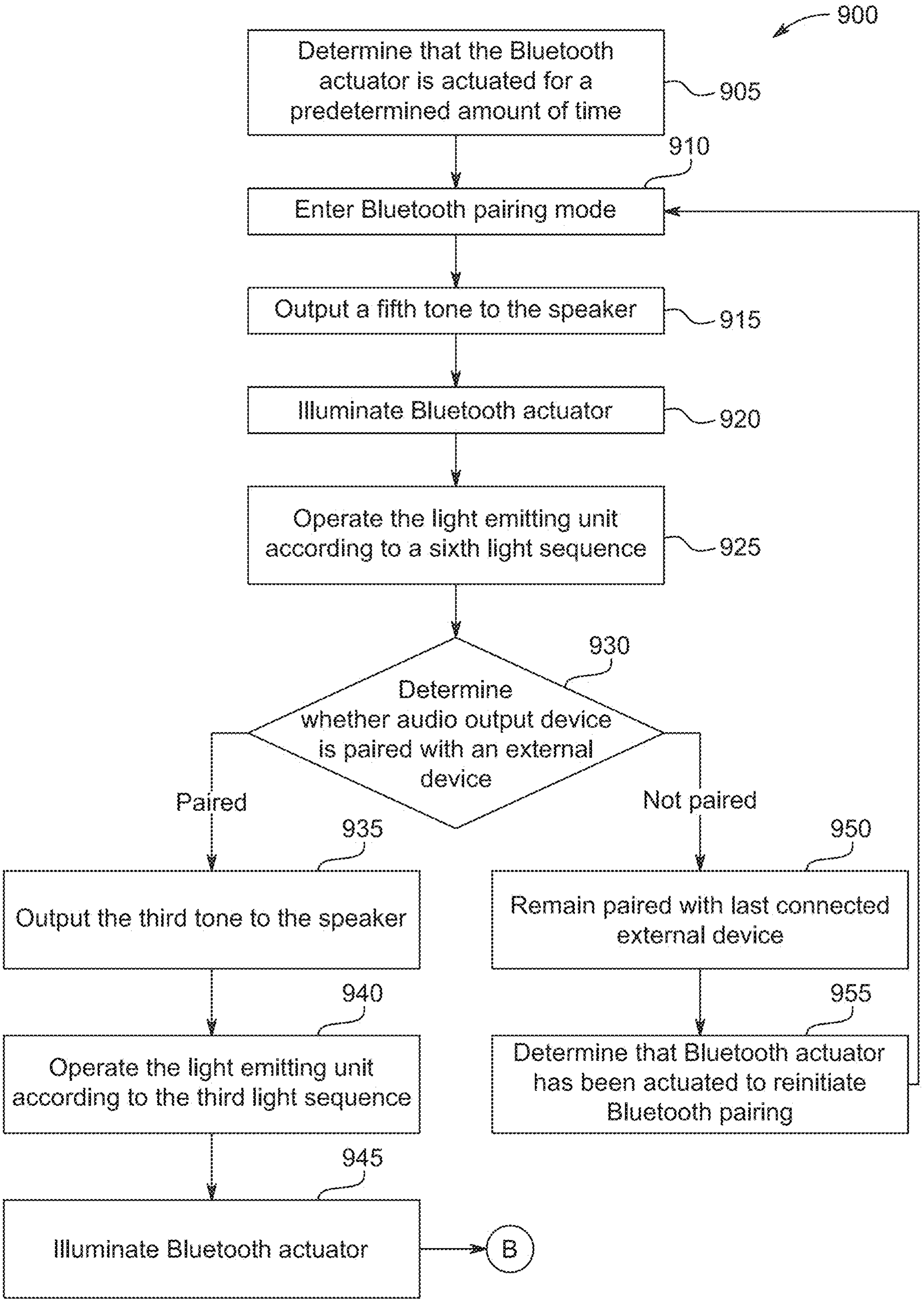
FIG. 9A is a flow chart illustrating a method of pairing the audio output device with an external device, according to some embodiments.
Figure 9B:
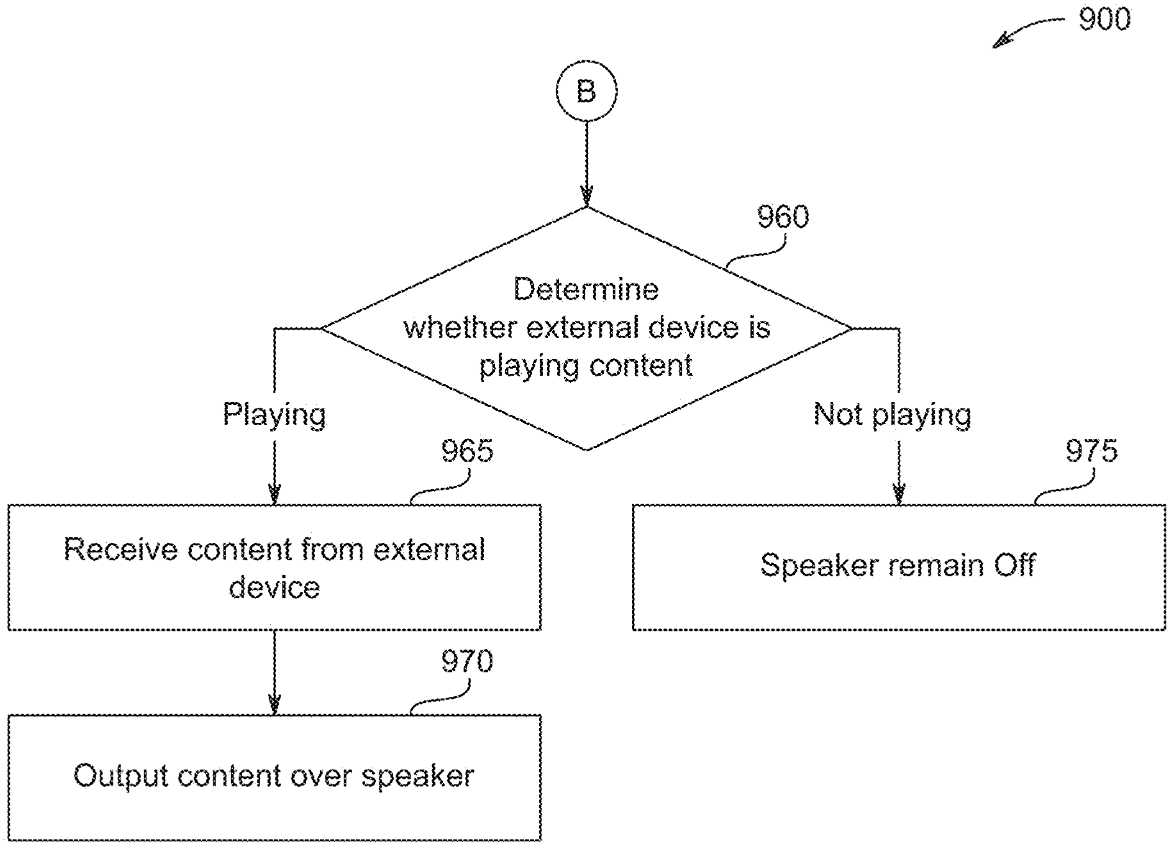
FIG. 9B is a flow chart illustrating a method of the audio output device outputting content from the external device, according to some embodiments.

FIGS. 9A and 9B are a method 900 of pairing the audio output device 100 with an external device, such as external device 305, upon powering ON, according to some embodiments. Although the illustrated method 900 includes specific steps, not all of the steps need to be performed or need to be performed in the order presented. In some embodiments, the method 900 is executed by the audio output device controller 500. The values of various thresholds or ranges described with respect to method 900 are provided as non-limiting examples and other values for such parameters are possible and may vary based on the type or condition of the audio output device 100, the type or condition of the external device 305, other factors, or a combination thereof.

In contrast to the method 800, the illustrated method 900 may be used to pair the audio output device 100 with an external device the first time the audio output device 100 is used or to pair the audio output device 100 with a different external device. The method 900 includes the controller 500 determining that the Bluetooth® actuator has been actuated (step 905). In some embodiments, the predetermined amount of time is a first predetermined amount of time. For example, the first predetermined amount of time may be any time less than 750 milliseconds (ms). In step 910, the controller 500 enters into a Bluetooth® pairing mode. In some embodiments, the Bluetooth® controller 515 of the audio output device 100 broadcasts a unique key (e.g., a UUID) at a set interval when in pairing mode. In step 915, the controller 500 outputs a fifth tone to the speaker 130. In some embodiments, the fifth tone is a certain pitch and frequency. For example, the fifth tone may be three distinct sounds each a first length in time in ascending pitch or frequency that are repeated throughout the course of the pairing mode every 5 seconds. In some embodiments, the fifth tone is volume independent. In step 920, the controller illuminates the Bluetooth® actuator 185. In some embodiments, an LED of the Bluetooth® actuator 185 flashes slowly at a rate of 1.0 Hertz (Hz) while the audio output device 100 searches for a Bluetooth® capable device, such as external device 305.

In step 925, the controller 500 provides a sixth light sequence to be emitted by the light emitting unit 150. In other words, the controller 500 operates the light emitting unit 150 according to the sixth light sequence. In some embodiments, the sixth light sequence includes turning OFF each segment 200, 205, 210, 215, 220, implementing a 100 ms delay, illuminate the third segment 210, implementing another 100 ms delay, illuminating the second segment 205 and the fourth segment 215, dimming the third segment 210 to a 30% illumination level (i.e., brightness), implementing another 100 ms delay, turning OFF the third segment 210, dimming the second segment 205 and the fourth segment 215 to the 30% illumination level, illuminating the first segment 200 and the fifth segment 220, implementing another 100 ms delay, turning OFF the second segment 205 and the fourth segment 215, dimming the first segment 200 and the fifth segment 220 to the 30% illumination level, implementing another 100 ms delay, turning OFF the first segment 200 and the fifth segment 220, implementing a 2200 ms delay, and then repeating the second light sequence starting at illuminating the third segment 210 again until pairing is complete or times out.

In decision step 930, the controller 500 determines whether the audio output device 100 is paired with an external device, such as external device 305. In some embodiments, the Bluetooth® controller 515 receives a receipt from the Bluetooth® controller 615 of the external device 305 to determine that the external device 305 is paired with the audio output device 100. When the controller 500 determines that the audio output device 100 is paired with the external device 305, the method 900 proceeds to step 935. When the controller 500 determines that the audio output device 100 is not paired with the external device 305, the method 900 proceeds to step 950. In some embodiments, the controller 500 tries to pair the audio output device 100 with the external device 305 for three minutes before determining that the audio output device 100 is not paired with the external device 305.

In step 935 (PAIRED at decision step 755), the controller 500 outputs the third tone to the speaker 130. In some embodiments, the third tone is a certain pitch and frequency. For example, the third tone may be two distinct sounds each a second length in time in ascending pitch or frequency. In some embodiments, the third tone is volume independent. In step 940, the controller 500 outputs the third light sequence to be emitted by the light emitting unit 150. In other words, the controller 500 operates the light emitting unit 150 according to the third light sequence. In some embodiments, the third light sequence includes turning OFF each segment 200, 205, 210, 215, 220, illuminating the first segment 200 and the fifth segment 220, implementing a 100 ms delay, illuminating the second segment 205 and the fourth segment 215, implementing another 100 ms delay, and illuminating the third segment 210. In step 945, the controller 500 illuminates the Bluetooth® actuator 185. In some embodiments, the LED of the Bluetooth® actuator illuminates solid. The method 900 continues to FIG. 9B.

In step 950 (NOT PAIRED at decision step 930), the controller 500 remains paired with the last connected external device. In step 955, the controller 500 determines that the Bluetooth® actuator 185 has been actuated. The method 900 then begins again at step 910 to reinitiate a pairing mode of the audio output device 100.

In decision step 960, the controller 500 determines whether the external device 305 is playing content. When the controller 500 determines that the external device 305 is playing content (e.g., on an audio app), the method 900 proceeds to step 965. When the controller 500 determines that the external device 305 is not playing content, the method 900 proceeds to step 975.

In step 965 (PLAYING at decision step 960), the controller 500 receives content from the external device 305. In step 970, the controller 500 outputs the content over the speaker 130. In some embodiments, the content is played at the volume that is set on the external device 305. In step 975 (NOT PLAYING at decision step 960), the controller 500 controls the speaker 130 to remain OFF.

Figure 10:
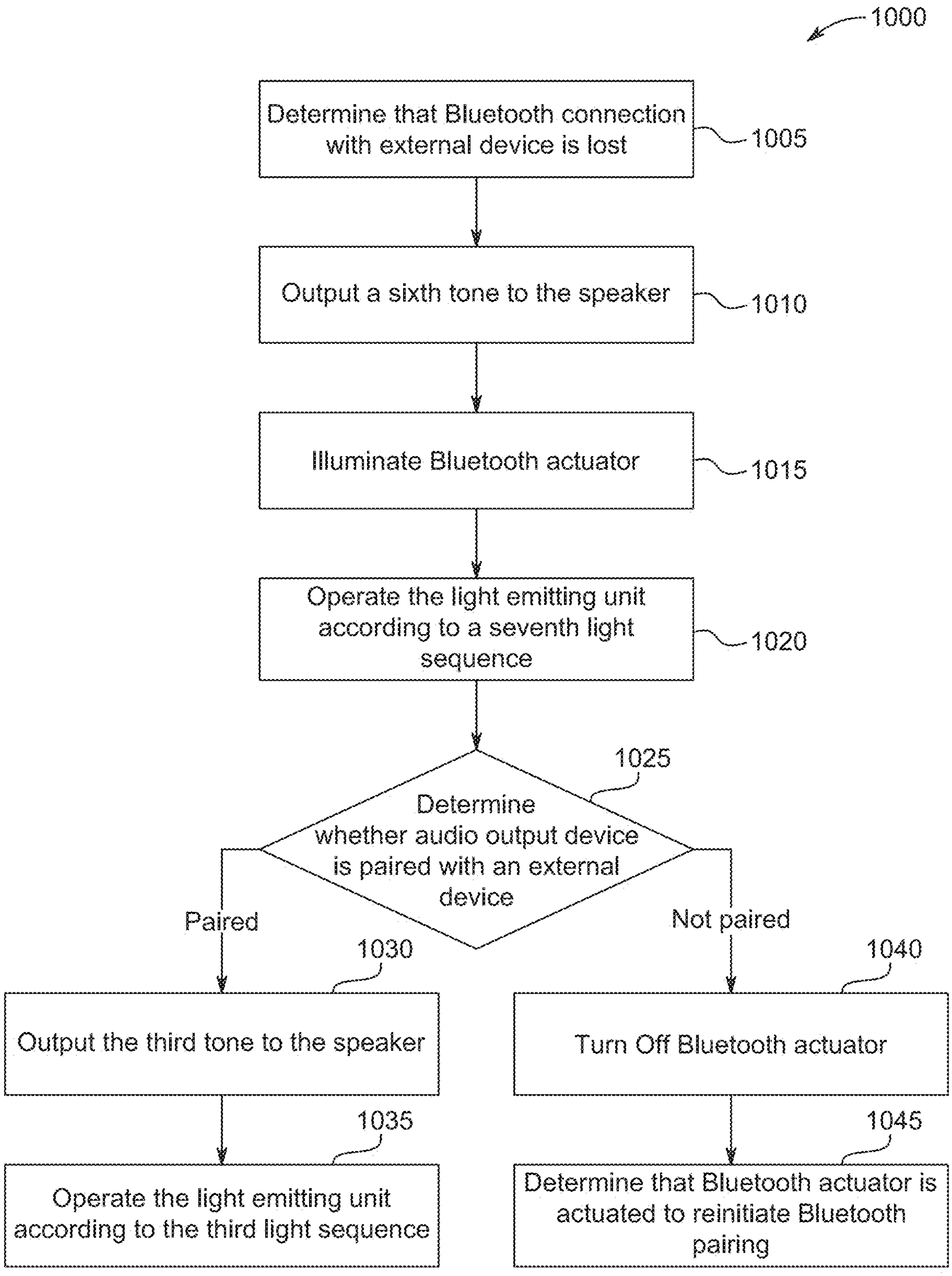
FIG. 10 is a flow chart illustrating a method of the audio output device losing a Bluetooth® connection with an external device, according to some embodiments.

FIG. 10 is a method 1000 of determining that the Bluetooth® connection with the external device 305 is lost, according to some embodiments. Although the illustrated method 1000 includes specific steps, not all of the steps need to be performed or need to be performed in the order presented. In some embodiments, the method 1000 is executed by the audio output device controller 500. The values of various thresholds or ranges described with respect to method 1000 are provided as non-limiting examples and other values for such parameters are possible and may vary based on the type or condition of the audio output device 100, the type or condition of the external device 305, other factors, or a combination thereof.

The method 1000 includes the controller 500 determining that the Bluetooth® connection with the external device 305 is lost (step 1005). In some embodiments, the Bluetooth® connection is lost when the audio output device 100 moves out of range of the external device 305. In step 1010, the controller 500 outputs a sixth tone to the speaker 130. In some embodiments, the sixth tone is a certain pitch and frequency. For example, the sixth tone may be two distinct sounds each a second length in time in descending pitch or frequency that is played every 5 seconds until a Bluetooth® connection is found. In some embodiments, the sixth tone is volume independent.

In step 1015, controller 500 illuminates the Bluetooth® actuator 185. In some embodiments, and LED of the Bluetooth® actuator 185 flashes slowly at a rate of 1.0 Hertz (Hz) while the audio output device 100 restores the Bluetooth® connection. In step 1020, the controller 500 provides a seventh light sequence to be emitted by the light emitting unit 150. In other words, the controller 500 operates the light emitting unit 150 according to the seventh light sequence. In some embodiments, the seventh light sequence includes illuminating each segment 200, 205, 210, 215, 220 and oscillating illumination of the segments at a rate of 0.5 Hz for a predetermined amount of time before illuminating each segment 200, 205, 210, 215, 220 solid.

In decision step 1025, the controller 500 determines whether the audio output device 100 is paired with an external device, such as external device 305. In some embodiments, the Bluetooth® controller 515 receives a receipt from the Bluetooth® controller 615 of the external device 305 to determine that the external device 305 is paired with the audio output device 100. When the controller 500 determines that the audio output device 100 is paired with the external device 305, the method 1000 proceeds to step 1030. When the controller 500 determines that the audio output device 100 is not paired with the external device 305, the method 1000 proceeds to step 1040. In some embodiments, the controller 500 tries to pair the audio output device 100 with the external device 305 for three minutes before determining that the audio output device 100 is not paired with the external device 305.

In step 1030 (PAIRED at decision step 1025), the controller 500 outputs the third tone to the speaker 130. In some embodiments, the third tone is a certain pitch and frequency. For example, the third tone may be two distinct sounds each a second length in time in ascending pitch or frequency. In step 1035, the controller 500 outputs the third light sequence to be emitted by the light emitting unit 150. In other words, the controller 500 operates the light emitting unit 150 according to the third light sequence. In some embodiments, the third light sequence includes turning OFF each segment 200, 205, 210, 215, 220, illuminating the first segment 200 and the fifth segment 220, implementing a 100 ms delay, illuminating the second segment 205 and the fourth segment 215, implementing another 100 ms delay, and illuminating the third segment 210.

In step 1040 (NOT PAIRED at decision step 1025), the controller 500 turns OFF the Bluetooth® actuator 185. For example, the controller 500 turns OFF the LED of the Bluetooth® actuator 185. In step 1045, the controller 500 determines that the Bluetooth® actuator 185 is actuated to reinitiate Bluetooth® pairing.

Figure 11:
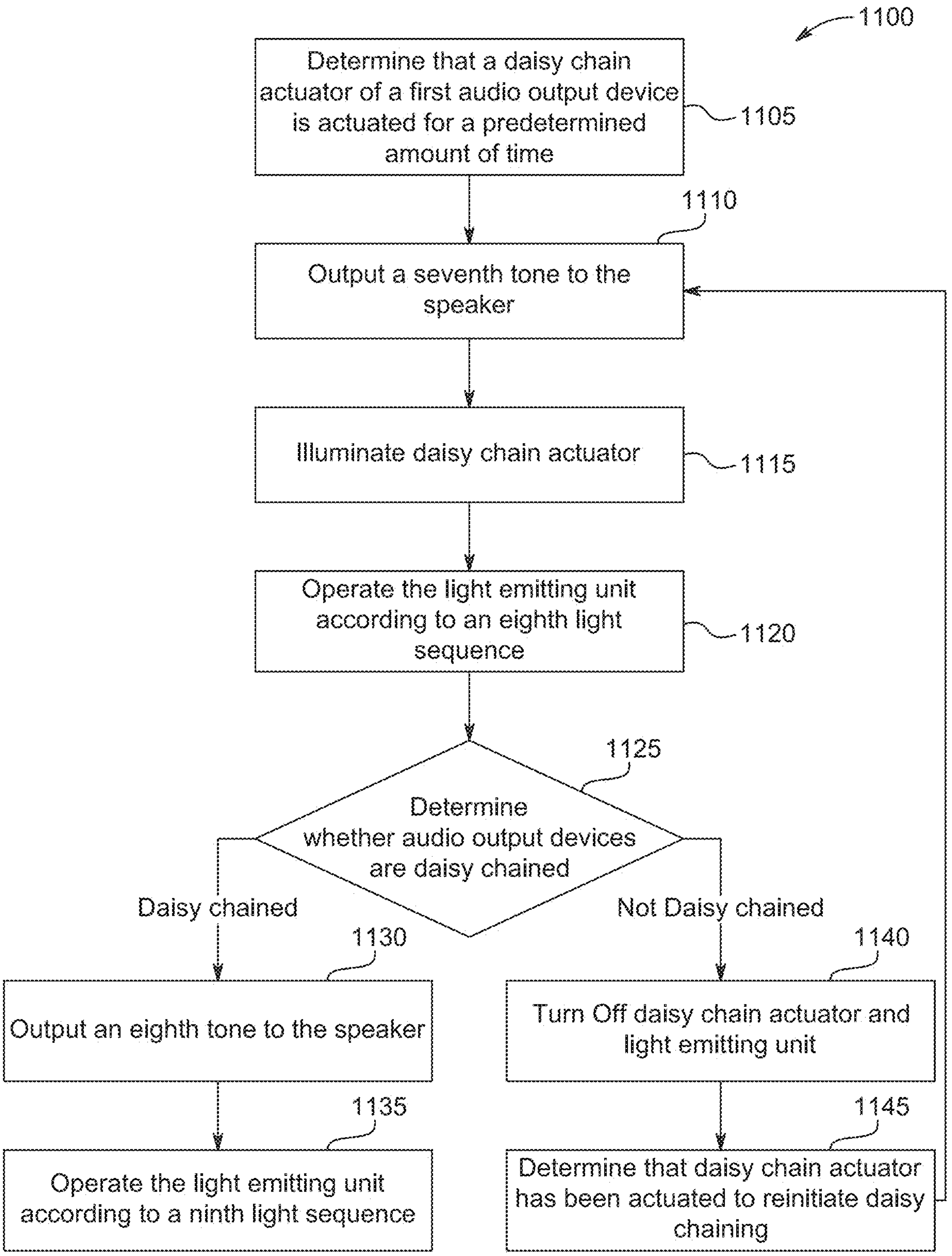
FIG. 11 is a flow chart illustrating a method of daisy chaining the audio output device with a second audio output device, according to some embodiments.

FIG. 11 is a method 1100 of daisy chaining the audio output device 100 with a second audio output device, such as audio output device 400, according to some embodiments. Although the illustrated method 1100 includes specific steps, not all of the steps need to be performed or need to be performed in the order presented. In some embodiments, the method 1100 is executed by the audio output device controller 500. The values of various thresholds or ranges described with respect to method 1100 are provided as non-limiting examples and other values for such parameters are possible and may vary based on the type or condition of the audio output device 100, the type or condition of the external device 305, other factors, or a combination thereof.

The method 1100 includes the controller 500 determining that a daisy chain actuator of a first audio output device, such as audio output device 100, is actuated for a predetermined amount of time (step 1105). In some embodiments, the predetermined amount of time is a first predetermined amount of time. For example, the first predetermined amount of time may be any time less than 750 milliseconds (ms). In step 1110, the controller 500 outputs a seventh tone to the speaker 130. In some embodiments, the seventh tone is a certain pitch and frequency. For example, the seventh tone may be three distinct sounds each a first length in time in ascending pitch or frequency that are repeated throughout the course of the daisy chaining mode. In some embodiments, the seventh tone is a higher pitch than the first tone. In some embodiments, the seventh tone is volume independent. In step 1115, the controller 500 illuminates the daisy chain actuator 190. In some embodiments, an LED of the daisy chain actuator 190 illuminates solid.

In step 1120, the controller 500 provides an eighth light sequence to be emitted by the light emitting unit 150. In other words, the controller 500 operates the light emitting unit 150 according to the eighth light sequence. In some embodiments, the eighth light sequence includes turning OFF each segment 200, 205, 210, 215, 220, illuminating the first segment 200, implementing a 100 ms delay, dimming the first segment 200 to a 60% illumination level (i.e., brightness), illuminating the second segment 205, implementing another 100 ms delay, further dimming the first segment 200 to a 30% illumination level, dimming the second segment 205 to the 60% illumination level, illuminating the third segment 210, implementing another 100 ms delay, turning OFF the first segment 200, dimming the second segment 205 to the 30% illumination level, dimming the third segment 210 to the 60% illumination level, turning ON the fourth segment 215, implementing another 100 ms delay, turning OFF the second segment 205, dimming the third segment 210 to the 30% illumination level, dimming the fourth segment 215 to the 60% illumination level, turning ON the fifth segment 220, implementing another 100 ms delay, turning OFF the third segment 210, dimming the fourth segment 215 to the 30% illumination level, implementing another 100 ms delay, turning OFF the fourth segment 215, implementing another 100 ms delay, illuminating the fourth segment 215, dimming the fifth segment 220 to the 60% illumination level, implementing another 100 ms delay, illuminating the third segment 210, dimming the fourth segment 215 to the 60% illumination level, dimming the fifth segment 220 to the 30% illumination level, and implementing another 100 ms delay, turning OFF the fifth segment 220, dimming the fourth segment 215 to the 30% illumination level, dimming the third segment 210 to the 60% illumination level, illuminating the second segment 205, implementing another 100 ms delay, turning OFF the fourth segment 215, dimming the third segment 210 to the 30% illumination level, dimming the second segment 205 to the 60% illumination level, illuminating the first segment 200, implementing another 100 ms delay, turning OFF the third segment 210, dimming the second segment 205 to the 30% illumination level, and implementing a 100 ms delay. The eighth light sequence repeats twice while the audio output device 100 daisy chains.

In decision step 1125, the controller 500 determines whether the audio output device 100 is daisy chained with another audio output device, such as the second audio output device 400. When the controller 500 determines that the audio output device 100 is daisy chained with the second audio output device 400, the method 1100 proceeds to step 1130. When the controller 500 determines that the audio output device 100 is not daisy chained with the second audio output device 400, the method 1100 proceeds to step 1140. In some embodiments, the controller 500 tries to daisy chain the audio output device 100 with the second audio output device 400 for three minutes before determining that the audio output device 100 is not daisy chained with the second audio output device 400.

In step 1130 (DAISY CHAINED at decision step 1125), the controller 500 outputs an eighth tone to the speaker 130. In some embodiments, the eighth tone is a certain pitch and frequency. For example, the eighth tone may be two distinct sounds each a third length in time in ascending pitch or frequency. In some embodiments, the eighth tone is volume independent. In step 1135, the controller 500 outputs a ninth light sequence to be emitted by the light emitting unit 150. In other words, the controller 500 operates the light emitting unit 150 according to the ninth light sequence. In some embodiments, the ninth light sequence includes illuminating the first segment 200, implementing a 100 ms delay, illuminating the second segment 205, implementing a 100 ms delay, illuminating the third segment 210, implementing a 100 ms delay, illuminating the fourth segment 215, implementing a 100 ms delay, and illuminating the fifth segment 210.

In step 1140 (NOT DAISY CHAINED at decision step 1125), the controller 500 turns OFF the daisy chain actuator 190 and the light emitting unit 150. For example, the controller 500 turns OFF the LED of the daisy chain actuator 190 and each segment 200, 205, 210, 215, 220. In step 1145, the controller 500 determines that the daisy chain actuator 190 is actuated to reinitiate the daisy chain mode. The method 1100 then begins again at step 1110 to attempt to daisy chain the audio output device 100 with the second audio output device 400.

Figure 12:
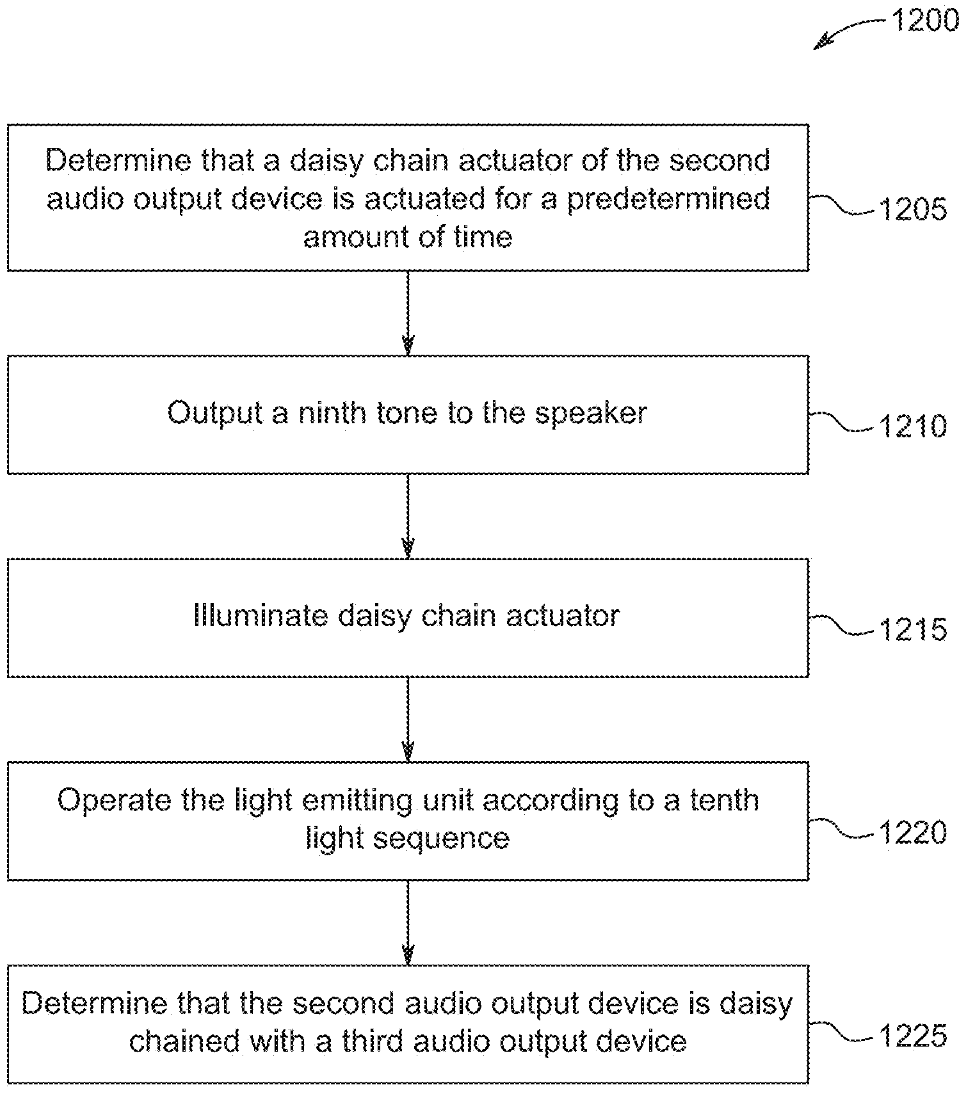
FIG. 12 is a flow chart illustrating a method of daisy chaining the second audio output device with a third audio output device, according to some embodiments.

FIG. 12 is a method 1200 of daisy chaining the second audio output device 400 with a third audio output device, according to some embodiments. Although the illustrated method 1200 includes specific steps, not all of the steps need to be performed or need to be performed in the order presented. In some embodiments, the method 1200 is executed by a controller of the second audio output device 400. The controller of the second audio output device 400 is the same as the controller 500 of the audio output device 100. The values of various thresholds or ranges described with respect to method 1200 are provided as non-limiting examples and other values for such parameters are possible and may vary based on the type or condition of the second audio output device 400, the type or condition of the external device 305, other factors, or a combination thereof.

The method 1200 includes the controller of a second audio output device determining that a daisy chain actuator of a second audio output device, such as second audio output device 400, is actuated for a predetermined amount of time (step 1205). In some embodiments, the predetermined amount of time is a first predetermined amount of time. For example, the first predetermined amount of time may be any time less than 750 milliseconds (ms). In step 1210, the controller of the second audio output device 400 outputs a ninth tone to the speaker of the second audio output device 400. In some embodiments, the ninth tone is a certain pitch and frequency. For example, the ninth tone may be three distinct sounds each a first length in time in ascending pitch or frequency that are repeated throughout the course of the daisy chaining mode. In some embodiments, the ninth tone is a higher pitch than the first tone and substantially the same as the seventh tone. In some embodiments, the ninth tone is volume independent. In step 1215, the controller of the second audio output device 400 illuminates a daisy chain actuator of the second audio output device 400. In some embodiments, an LED of the daisy chain actuator of the second audio output device 400 flashes slowly at a rate of 1.0 Hertz (Hz) while the second audio output device 400 searches for a third audio output device.

In step 1220, the controller of the second audio output device 400 provides a tenth light sequence to be emitted by a light emitting unit of the second audio output device 400. In other words, the controller operates the light emitting unit of the second audio output device 400 according to the tenth light sequence. In some embodiments, the tenth light sequence is the same as the eighth light sequence. In some embodiments, the tenth light sequence includes illuminating the first segment, implementing a 100 ms delay, dimming the first segment to a 60% illumination level (i.e., brightness), illuminating the second segment, implementing another 100 ms delay, further dimming the first segment to a 30% illumination level, dimming the second segment to the 60% illumination level, illuminating the third segment, implementing another 100 ms delay, turning OFF the first segment, dimming the second segment to the 30% illumination level, dimming the third segment to the 60% illumination level, turning ON the fourth segment, implementing another 100 ms delay, turning OFF the second segment, dimming the third segment to the 30% illumination level, dimming the fourth segment to the 60% illumination level, turning ON the fifth segment, implementing another 100 ms delay, turning OFF the third segment, dimming the fourth segment to the 30% illumination level, implementing another 100 ms delay, turning OFF the fourth segment, implementing another 100 ms delay, illuminating the fourth segment, dimming the fifth segment to the 60% illumination level, implementing another 100 ms delay, illuminating the third segment, dimming the fourth segment to the 60% illumination level, dimming the fifth segment to the 30% illumination level, and implementing another 100 ms delay, turning OFF the fifth segment, dimming the fourth segment to the 30% illumination level, dimming the third segment to the 60% illumination level, illuminating the second segment, implementing another 100 ms delay, turning OFF the fourth segment, dimming the third segment to the 30% illumination level, dimming the second segment to the 60% illumination level, illuminating the first segment, implementing another 100 ms delay, turning OFF the third segment, dimming the second segment to the 30% illumination level, and implementing a 100 ms delay. The tenth light sequence repeats twice while the second audio output device 400 is in the daisy chain mode.

In step 1225, the controller of the second audio output device 400 determines that the second audio output device 400 is daisy chained with a third audio output device. In some embodiments, the third audio output device is identical to the audio output device 100 and the second audio output device 400.

Figure 13:
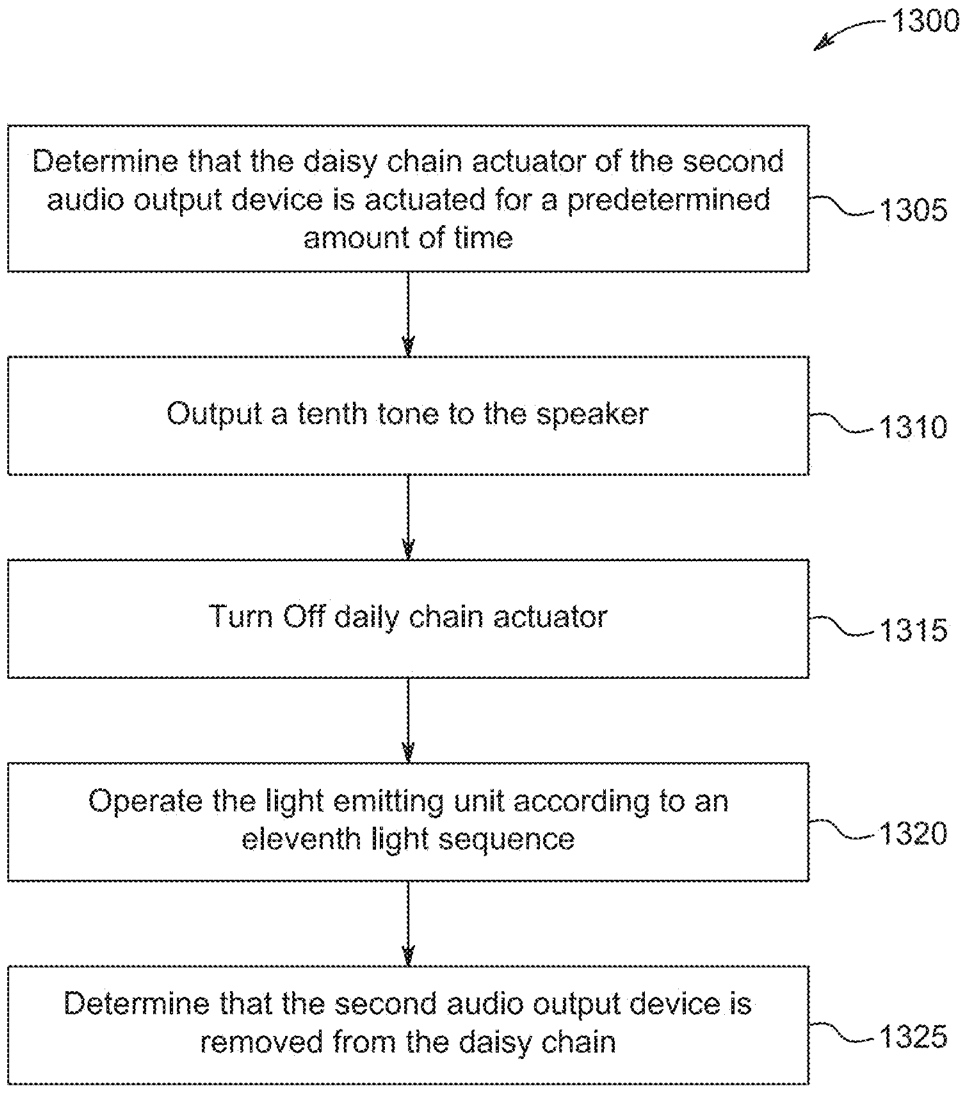
FIG. 13 is a flow chart illustrating a method of removing the second audio output device from the daisy chain, according to some embodiments.

FIG. 13 is a method 1300 of removing the second audio output device 400 from a daisy chain, according to some embodiments. Although the illustrated method 1300 includes specific steps, not all of the steps need to be performed or need to be performed in the order presented. In some embodiments, the method 1300 is executed by a controller of the second audio output device 400. The controller of the second audio output device 400 is the same as the controller 500 of the audio output device 100. The values of various thresholds or ranges described with respect to method 1300 are provided as non-limiting examples and other values for such parameters are possible and may vary based on the type or condition of the second audio output device 400, the type or condition of the external device 305, other factors, or a combination thereof.

The method 1300 includes the controller of the second audio output device 400 determining that the daisy chain actuator of the second audio output device 400 is actuated for a predetermined amount of time (step 1305). In some embodiments, the predetermined amount of time is a first predetermined amount of time. For example, the first predetermined amount of time may be any time less than 750 milliseconds (ms). In step 1310, the controller of the second audio output device 400 outputs a tenth tone to the speaker of the second audio output device 400. In some embodiments, the tenth tone is a certain pitch and frequency. For example, the tenth tone may be two distinct sounds each a second length in time in descending pitch or frequency. In some embodiments, the tenth tone is volume independent. In step 1315, the controller of the second audio output device 400 turns OFF the daisy chain actuator of the second audio output device 400.

In step 1320, the controller of the second audio output device 400 provides an eleventh light sequence to be emitted by a light emitting unit of the second audio output device 400. In other words, the controller operates the light emitting unit of the second audio output device 400 according to the eleventh light sequence. In some embodiments, the eleventh light sequence may be similar to one of the light sequences described above. In step 1325, the controller of the second audio output device 400 determines that the second audio output device 400 is removed from the daisy chain and is an independent audio output device.

Figure 14:
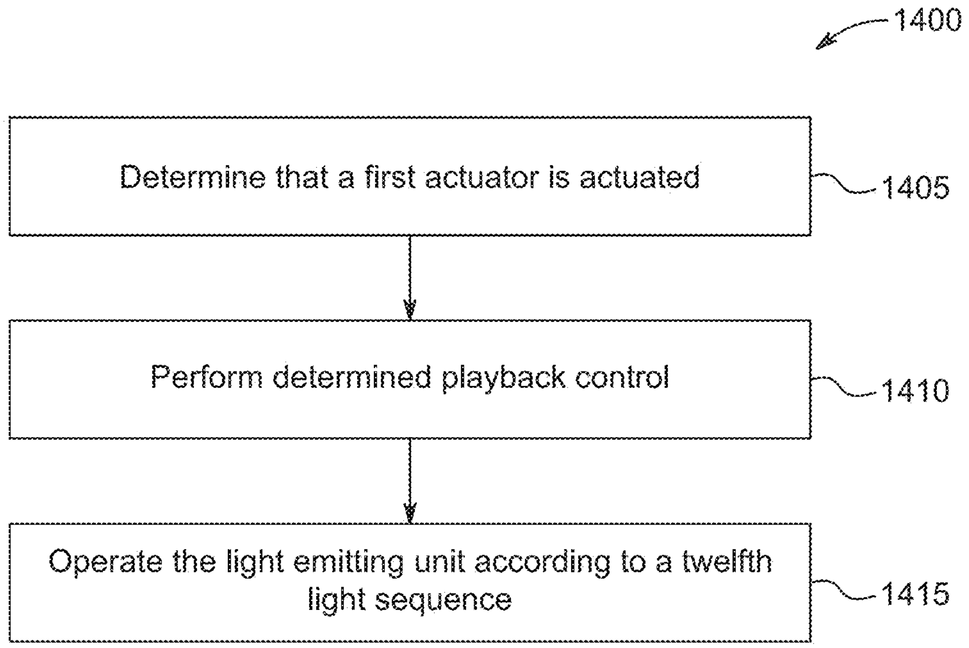
FIG. 14 is a flow chart illustrating a method of playback control on the audio output device, according to some embodiments.

FIG. 14 is a method 1400 of playback control on the audio output device 100, according to some embodiments. Although the illustrated method 1400 includes specific steps, not all of the steps need to be performed or need to be performed in the order presented. In some embodiments, the method 1400 is executed by the audio output device controller 500. The values of various thresholds or ranges described with respect to method 1400 are provided as non-limiting examples and other values for such parameters are possible and may vary based on the type or condition of the audio output device 100, the type or condition of the external device 305, other factors, or a combination thereof.

The method 1400 includes the controller 500 determining that a first actuator is actuated. In some embodiments, the first actuator is the play actuator 170 (step 1405). In some embodiments, play actuator 170 is actuated for a first predetermined amount of time when content is not playing over the speaker 130 of the audio output device 100 to initiate "playing" the content over the speaker. For example, the first predetermined amount of time may be any time less than 750 milliseconds (ms). Alternatively, or additionally, in some embodiments, the play actuator 170 is actuated for the first predetermined amount of time when content is playing over the speaker 130 of the audio output device 100 to pause the content over the speaker. Alternatively, or additionally, in some embodiments, the play actuator 170 is actuated twice to advance the content (e.g., skip ahead to play a next audio file). Alternatively, or additionally, in some embodiments, the play actuator 170 is actuated three times to make the content go backwards (e.g., skip backwards to play a last audio file). Alternatively, or additionally, in some embodiments, the play actuator 170 is actuated for a second predetermined amount of time to enter into an audio equalization mode. For example, the second predetermined amount of time may be any time greater than 1 second. In some embodiments, the controller 500 outputs a bass tone when the play actuator 170 is actuated for a second predetermined amount of time to enter into an audio equalization mode. In some embodiments, once in the audio equalization mode, the controller 500 may determine that the volume increase actuator 175 is actuated to increase the bass level or that the volume decrease actuator 180 is actuated to decrease the bass level. In some embodiments, the controller 500 determines that the play actuator 170 is once again actuated to set the bass level and to advance into adjusting a treble level. In some embodiments, the controller 500 outputs a treble tone when the play actuator 170 is once again actuated to set the bass level and to advance into adjusting a treble level. In some embodiments, once in the treble mode, the controller 500 may determine that the volume increase actuator 175 is actuated to increase the treble level or that the volume decrease actuator 180 is actuated to decrease the treble level. In some embodiments, the controller 500 determines that the play actuator 170 is once again actuated to set the treble level and to exit the audio equalization mode.

In step 1410, the controller 500 performs the determined playback control. For example, based on the actuation of the play actuator 170 as described above, the controller performs a specific control (e.g., play, pause, forward, backward, bass level, treble level). In step 1415, the controller 500 provides a twelfth light sequence to be emitted by the light emitting unit 150. In other words, the controller 500 operates the light emitting unit 150 according to the twelfth light sequence. The twelfth light sequence is dependent on the playback control performed and is shown in Table 1, below.

TABLE 1

| Twelfth Light Sequence | |
|---|---|
| Playback Control | Twelfth Light Sequence |
| Play/Pause | Each segment 200, 205, 210, 215, 220 flashes at a rate of 0.5 Hz |
| Forward | Each segment 200, 205, 210, 215, 220 turned OFF, 100 ms delay implemented, fifth segment 220 illuminated, another 100 ms delay implemented, fourth segment 215 illuminated, another 100 ms delay implemented, third segment 210 illuminated, another 100 ms delay implemented, second segment 205 illuminated, another 100 ms delay implemented, first segment 200 illuminated, each segment 200, 205, 210, 215, 220 flashes at a rate of 0.5 Hz |
| Backward | Each segment 200, 205, 210, 215, 220 turned OFF, 100 ms delay implemented, first segment 200 illuminated, another 100 ms delay implemented, second segment 205 illuminated, another 100 ms delay implemented, third segment 210 illuminated, another 100 ms delay implemented, fourth segment 215 illuminated, another 100 ms delay implemented, fifth segment 220 illuminated, each segment 200, 205, 210, 215, 220 flashes at a rate of 0.5 Hz |
| Bass Level Increase & Treble Level Increase | Each segment 200, 205, 210, 215, 220 flashes once at a rate of 0.5 Hz, third segment 210 illuminated, 100 ms delay implemented, second segment 205 illuminated, 100 ms delay implemented, first segment 200 illuminated, 100 ms delay implemented, third segment 210 dimmed to 40%, 100 ms delay implemented, second segment 205 dimmed to 40%, 100 ms delay implemented, first segment 200 dimmed to 40%, each segment 200, 205, 210, 215, 220 flash once at a rate of 0.5 Hz, |
| Bass Level Decrease & Treble Level Decrease | Each segment 200, 205, 210, 215, 220 flashes once at a rate of 0.5 Hz, third segment 210 illuminated, 100 ms delay implemented, fourth segment 215 illuminated, 100 ms delay implemented, fifth segment 220 illuminated, 100 ms delay implemented, third segment 210 dimmed to 40%, 100 ms delay implemented, fourth segment 215 dimmed to 40%, 100 ms delay implemented, fifth segment 220 dimmed to 40%, each segment 200, 205, 210, 215, 220 flash once at a rate of 0.5 Hz, |

Figure 15:
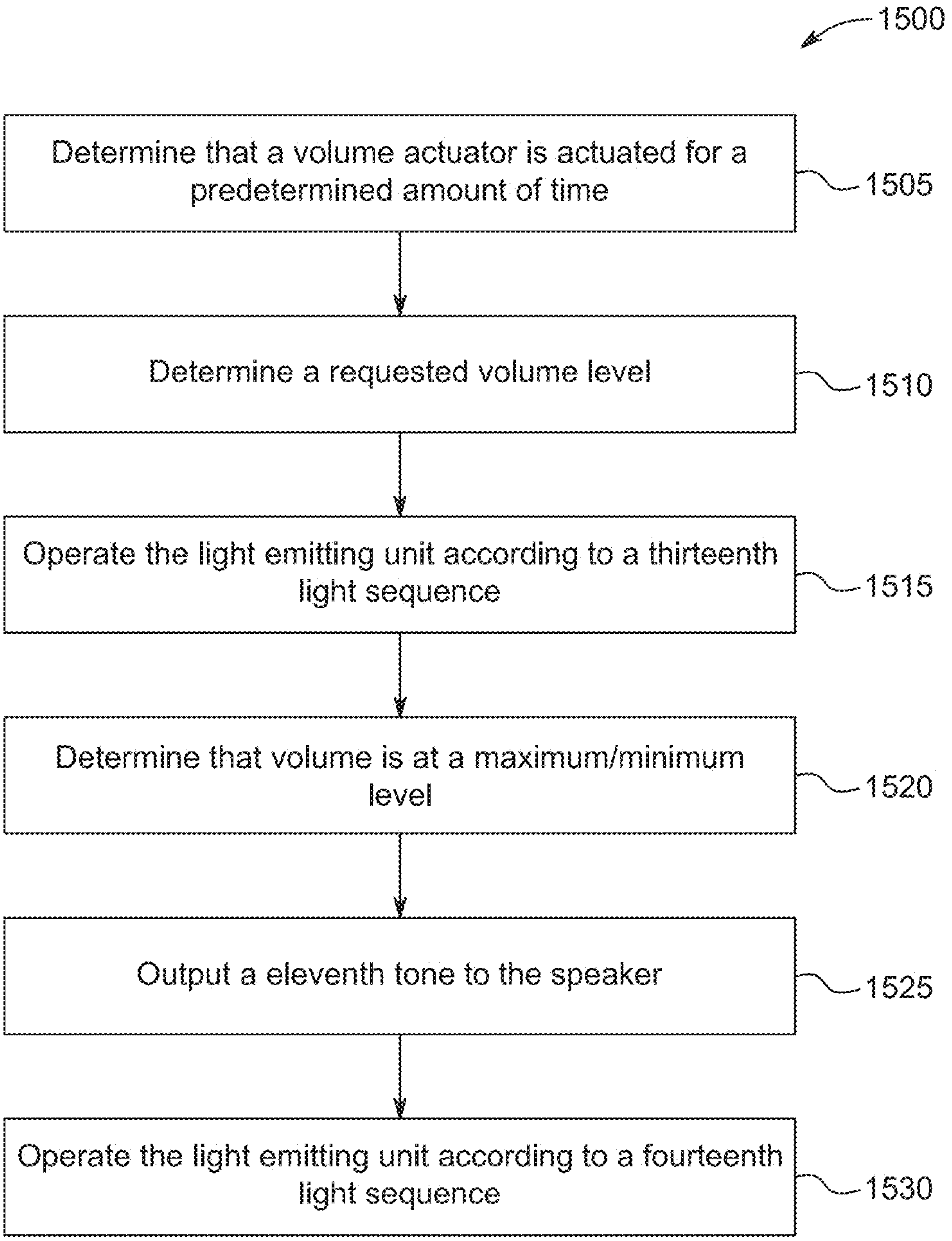
FIG. 15 is a flow chart illustrating a method of volume control reaching a maximum/minimum level on the audio output device, according to some embodiments.

FIG. 15 is a flow chart illustrating a method 1500 of volume control reaching a maximum/minimum level on the audio output device 100, according to some embodiments. Although the illustrated method 1500 includes specific steps, not all of the steps need to be performed or need to be performed in the order presented. In some embodiments, the method 1500 is executed by the audio output device controller 500. The values of various thresholds or ranges described with respect to method 1500 are provided as non-limiting examples and other values for such parameters are possible and may vary based on the type or condition of the audio output device 100, the type or condition of the external device 305, other factors, or a combination thereof.

The method 1500 includes the controller 500 determining that a volume actuator 175, 180 is actuated for a predetermined amount of time (step 1505). In some embodiments, the volume actuator 175, 180 is actuated for a first predetermined amount of time. For example, the first predetermined amount of time may be any time less than 750 milliseconds (ms). In step 1510, the controller 500 determines a requested volume level. In some embodiments, the controller 500 determines the requested volume level based on a number of times that the volume actuator 175 is actuated. For example, volume may be controlled in a 1:1 relationship with the volume selected on the external device 305 and a single actuation of the volume actuator 175, 180 may increase the volume by one volume level. The minimum volume may be 0 and the maximum volume may be 15 such that 15 actuations of the volume increase actuator 175 would take the volume from 0 to 15.

In step 1515, the controller 500 provides a thirteenth light sequence to be emitted by the light emitting unit 150. In other words, the controller 500 operates the light emitting unit 150 according to the thirteenth light sequence. In some embodiments, the thirteenth light sequence is dependent on the requested volume level and is shown in Table 2, below.

TABLE 2

| Thirteenth Light Sequence | |
|---|---|
| Volume Level | Thirteenth Light Sequence |
| 0 | All segments 200, 205, 210, 215, 220 turned OFF |
| 1 | First segment 200 illuminated to a 30% illumination level |
| 2 | First segment 200 illuminated to a 60% illumination level |
| 3 | First segment 200 fully illuminated (100% illumination level) |
| 4 | First segment 200 fully illuminated, second segment 205 illuminated to a 30% illumination level |
| 5 | First segment 200 fully illuminated, second segment 205 illuminated to a 60% illumination level |
| 6 | First segment 200 fully illuminated, second segment 205 fully illuminated |
| 7 | First segment 200 fully illuminated, second segment 205 fully illuminated, third segment 210 illuminated to the 30% illumination level |
| 8 | First segment 200 fully illuminated, second segment 205 fully illuminated, third segment 210 illuminated to the 60% illumination level |
| 9 | First segment 200 fully illuminated, second segment 205 fully illuminated, third segment 210 fully illuminated |
| 10 | First segment 200 fully illuminated, second segment 205 fully illuminated, third segment 210 fully illuminated, fourth segment 215 illuminated to the 30% illumination level |
| 11 | First segment 200 fully illuminated, second segment 205 fully illuminated, third segment 210 fully illuminated, fourth segment 215 illuminated to the 60% illumination level |
| 12 | First segment 200 fully illuminated, second segment 205 fully illuminated, third segment 210 fully illuminated, fourth segment 215 fully illuminated |
| 13 | First segment 200 fully illuminated, second segment 205 fully illuminated, third segment 210 fully illuminated, fourth segment 215 fully illuminated, fifth segment 220 illuminated to the 30% illumination level |

TABLE 2-continued

| Thirteenth Light Sequence | |
|---|---|
| Volume Level | Thirteenth Light Sequence |
| 14 | First segment 200 fully illuminated, second segment 205 fully illuminated, third segment 210 fully illuminated, fourth segment 215 fully illuminated, fifth segment 220 illuminated to the 60% illumination level |
| 15 | First segment 200 fully illuminated, second segment 205 fully illuminated, third segment 210 fully illuminated, fourth segment 215 fully illuminated, fifth segment 220 fully illuminated |

In step 1520, the controller 500 determines that the volume level is at a maximum/minimum level. For example, the controller may determine that the volume level is at 15 for a maximum level and at 0 for a minimum level. In step 1525, the controller outputs an eleventh tone to the speaker 130. In some embodiments, the eleventh tone is a certain pitch and frequency. For example, the eleventh tone may be two distinct sounds each a second length in time at the same pitch or frequency. In some embodiments, the eleventh tone is volume independent. In step 1530, the controller 500 provides a fourteenth light sequence to be emitted by the light emitting unit 150. In other words, the controller 500 operates the light emitting unit 150 according to the fourteenth light sequence. In some embodiments, the fourteenth light sequence includes flashing each segment 200, 205, 210, 215, 220 once at 0.5 Hz. When maximum volume is reached, the controller 500 then flashes each segment 200, 205, 210, 215, 220 at 4 Hz for 500 ms, twice.

Figure 16:
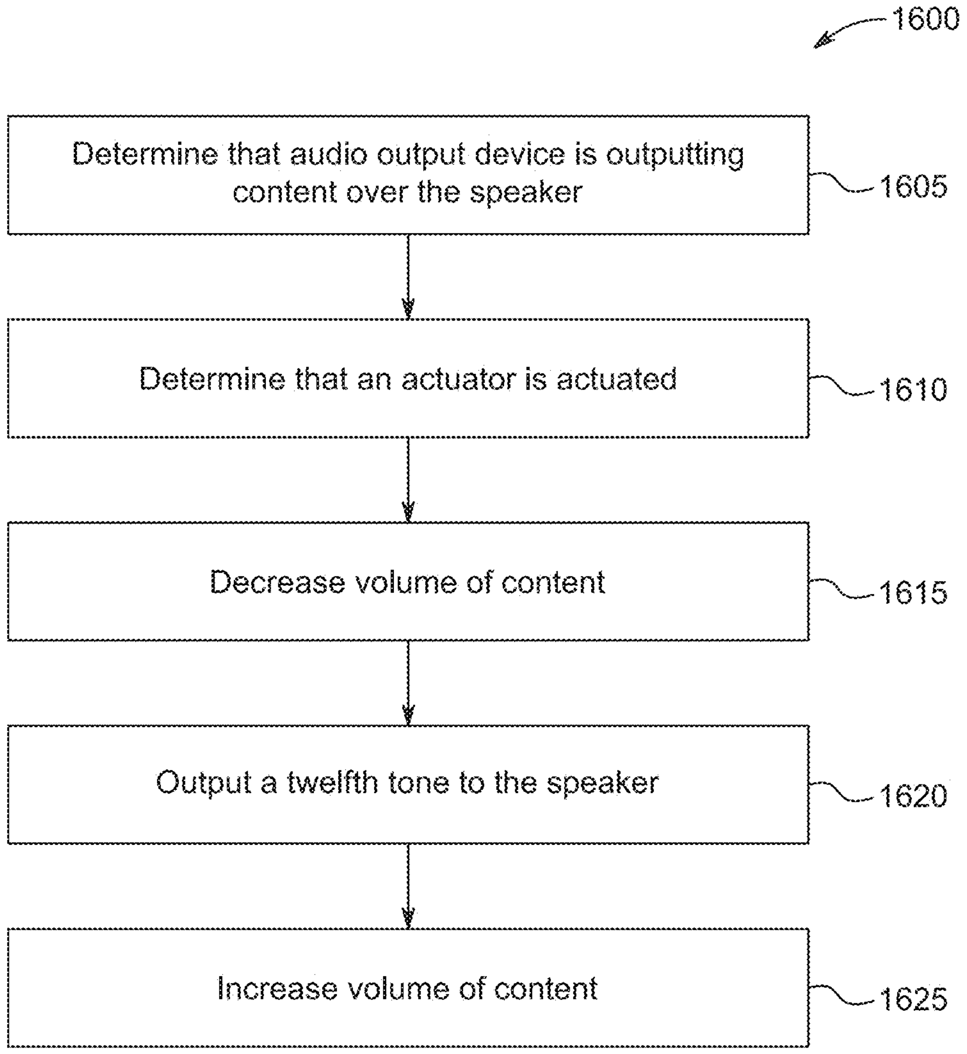
FIG. 16 is a flow chart illustrating a method of controlling a volume and providing a tone in response to an actuation on the audio output device, according to some embodiments.

FIG. 16 is a flow chart illustrating a method 1600 of controlling a volume and providing a tone in response to an actuation on the audio output device 100, according to some embodiments. Although the illustrated method 1600 includes specific steps, not all of the steps need to be performed or need to be performed in the order presented. In some embodiments, the method 1600 is executed by the audio output device controller 500. The values of various thresholds or ranges described with respect to method 1600 are provided as non-limiting examples and other values for such parameters are possible and may vary based on the type or condition of the audio output device 100, the type or condition of the external device 305, other factors, or a combination thereof.

The method 1600 includes the controller 500 determining that the audio output device 100 is outputting content over the speaker 130 (step 1605). In step 1610, the controller 500 determines that an actuator 170, 175, 180, 185, 190 is actuated. In step 1615, the controller 500 decreases the volume of the content that is output over the speaker 130. In some embodiments, the controller 500 drops the content from being played at volume level to a second volume level that is 50% of the volume level. In step 1620, the controller 500 outputs a twelfth tone to the speaker 130. The twelfth tone is dependent on the actuator that is actuated and may be any of the tones discussed herein. In some embodiments, the controller 500 plays the twelfth tone for a predetermined amount of time at a volume different from the volume level. In some embodiments, the predetermined amount of time is 0.4 seconds. In some embodiments, all tones are played at volume level 8. In step 1625, the controller 500 increases the volume of the content that is output over the speaker 130. In some embodiments, the controller 500 gradually increases the volume level of the content back to the volume level once the tone is played for the predetermined amount of time. For example, the controller 500 may linearly or incrementally increase the volume level of the content. Alternatively, the controller 500 may exponentially or abruptly increase the volume level of the content.

Figure 17:
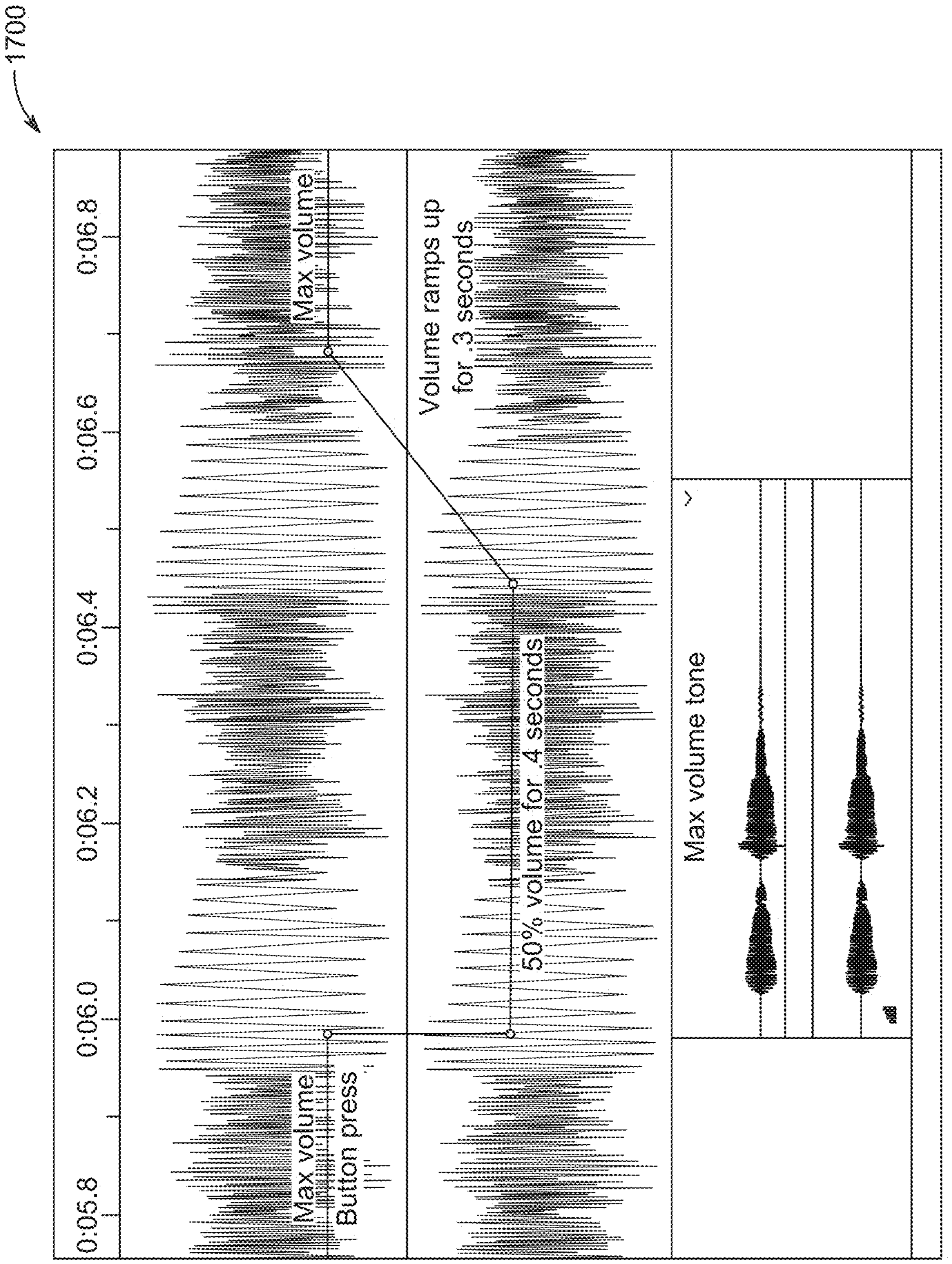
FIG. 17 is a graph illustrating volume control when a tone is provided on the audio output device, according to some embodiments.

FIG. 17 is a graph 1700 illustrating volume control when a tone is provided on the audio output device 100, according to some embodiments. As described above in the method 1600 of FIG. 16, when the volume increase actuator 175 is actuated, the controller 500 determines whether a maximum volume level is requested. When it is determined that the speaker 130 is outputting content at the maximum volume level and the volume increase actuator 175 is actuated, the controller 500 provides a tone to be played over the speaker 130. The controller 500 drops the content from being played at the maximum volume to a 50% volume output and plays the tone for a predetermined amount of time at a volume different from the maximum volume. In some embodiments, the predetermined amount of time is 0.4 seconds. In some embodiments, the maximum volume is a volume level 15 and the volume different from the maximum volume is a volume level 8. In some embodiments, all tones are played at volume level 8. The controller 500 may then gradually increase the volume level of the content back to the maximum volume level (e.g., volume level 15) once the tone is played for the predetermined amount of time. In some embodiments, the audio output device 100 plays content at a last volume level when the audio output device 100 was powered OFF.

In addition to playing audio files, the audio output device 100 may play phone calls over the speaker 130. In some embodiments, incoming phone calls may be muted and content playing over the speaker 130 may be paused. When a phone call ends, the content will ramp up to a selected volume (e.g., the volume at which the content was previously playing) and resume playing.

In some embodiments, the audio output device 100 may be reset to factory settings. For example, when the audio output device 100 is in a Bluetooth® pairing mode and the controller 500 determines that the Bluetooth® actuator 185, the daisy chain actuator 190, and the play actuator 170 are each actuated for 5 seconds, the controller 500 performs a factory settings reset. In some embodiments, the factory setting reset resets the memory 525 of the controller 500.

In some embodiments, when the audio output device 100 is powered ON and a charging cable is coupled to the charging port 195, the audio output device 100 will receive charging power. In some embodiments, when the audio output device 100 is powered OFF and a charging cable is coupled to the charging port 195, the audio output device 100 will not receive charging power.

In some embodiments, after a predetermined amount of time is elapsed, the controller 500 will control the light emitting unit 150 to dim the light segments 200, 205, 210, 215, 220 to a 50% illumination level. For example, the predetermined amount of time may be 3 minutes. The controller 500 may control the light segments 200, 205, 210, 215, 220 to fully illuminate (e.g., 100% illumination level) when an input from any actuator is received.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. For example, although specific light sequences are described for particular functions of the audio output device 100, the light emitting unit 150 may emit other sequences or patterns of light for each function or for different functions. The sequences may include various combinations of turning on, turning off. flashing, dimming, intensifying, etc. the light segments 200, 205, 210, 215, 220.

Various features and advantages of the invention are set forth in the following claims.

What is claimed is:

1. An audio output device comprising:

a housing;

a speaker provided in the housing;

a plurality of actuators provided on the housing;

a light emitting unit provided on the housing, the light emitting unit including a plurality of light emitting segments arranged in a line; and a controller located within the housing and including an electronic processor, a memory, and a transceiver, the controller coupled to the speaker, the plurality of actuators, and the light emitting unit, the controller configured to:

determine that a first actuator of the plurality of actuators is actuated, and operate the light emitting unit according to a first light sequence in response to the first actuator being actuated, wherein the first light sequence illuminates each of the plurality of light emitting segments according to a parameter different from other light emitting segments of the plurality of light emitting segments.

2. The audio output device of claim 1, wherein a first light emitting segment of the plurality of light emitting segments includes a first LED and a second light emitting segment of the plurality of light emitting segments includes a second LED, wherein the first LED is illuminated at a first brightness and the second LED is illuminated at a second brightness during the first light sequence, and wherein the first brightness is different than the second brightness.

3. The audio output device of claim 1, wherein a first light emitting segment of the plurality of light emitting segments includes a first LED and a second light emitting segment of the plurality of light emitting segments includes a second LED, wherein the first LED is illuminated at a first time and the second LED is illuminated at a second time during the first light sequence, and wherein the second time is after the first time.

4. The audio output device of claim 1, wherein the first light sequence indicates initiation of an operation of the audio output device, and wherein the controller is also configured to operate the light emitting unit according to a second light sequence upon completion of the operation.

5. The audio output device of claim 4, wherein the second light sequence is different than the first light sequence.

6. The audio output device of claim 1, wherein the controller is configured to:

determine that a second actuator of the plurality of actuators is actuated, and operate the light emitting unit according to a second light sequence in response to the second actuator being actuated, the second light sequence being different than the first light sequence.

7. The audio output device of claim 6, wherein the first actuator initiates pairing of the audio output device with an external device that provides content to the audio output device, and wherein the second actuator initiates pairing of the audio output device with another device that receives content from the audio output device.

8. The audio output device of claim 1, wherein the controller is also configured to output a tone over the speaker in response to the first actuator being actuated.

9. The audio output device of claim 8, wherein the tone is synched with the first light sequence.

10. The audio output device of claim 8, wherein the controller is also configured to drop a volume level of content being output by the speaker while outputting the tone.

11. The audio output device of claim 10, wherein the controller is also configured to gradually increase the volume level of the content being output by the speaker after the tone is played.

12. The audio output device of claim 1, wherein each actuator of the plurality of actuators includes an LED that illuminates upon actuation.

13. The audio output device of claim 1, wherein the housing is an elongated housing having a first end, a second opposite the first end, and a longitudinal axis extending through the first end and second end, and wherein the plurality of light emitting segments is arranged in the line extending parallel to the longitudinal axis.

14. The audio output device of claim 13, wherein the plurality of actuators is also arranged in a line extending parallel to the longitudinal axis.

15. The audio output device of claim 1, further comprising a battery pack interface configured to receive a battery pack.

16. The audio output device of claim 1, wherein the parameter includes at least one selected from a group consisting of illumination timing, brightness, and color.

* * * * *